US009420300B2

(12) United States Patent
Helle et al.

(10) Patent No.: US 9,420,300 B2
(45) Date of Patent: Aug. 16, 2016

(54) VIDEO DECODER AND A VIDEO ENCODER USING MOTION-COMPENSATED PREDICTION

(71) Applicant: Fraunhofer-Gesellschaft zur Foerderung der angewandten Forschung e.V., Munich (DE)

(72) Inventors: Philipp Helle, Berlin (DE); Detlev Marpe, Berlin (DE); Heiko Schwarz, Panketal (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 830 days.

(21) Appl. No.: 13/647,969

(22) Filed: Oct. 9, 2012

(65) Prior Publication Data

US 2013/0039426 A1    Feb. 14, 2013

Related U.S. Application Data

(63) Continuation of application No. PCT/EP2011/055504, filed on Apr. 8, 2011.

(30) Foreign Application Priority Data

Apr. 13, 2010 (EP) ..................................... 10159808
Apr. 13, 2010 (WO) .................. PCT/EP2010/054837

(51) Int. Cl.
*H04N 7/36* (2006.01)
*H04N 19/36* (2014.01)
(Continued)

(52) U.S. Cl.
CPC .............. *H04N 19/36* (2014.11); *H04N 19/30* (2014.11); *H04N 19/51* (2014.11); *H04N 19/52* (2014.11); *H04N 19/57* (2014.11)

(58) Field of Classification Search
CPC ..... H04N 19/56; H04N 19/537; H04N 19/54; H04N 19/543
See application file for complete search history.

(56) References Cited

U.S. PATENT DOCUMENTS 5,781,249 A * 7/1998 Hwang .................. H04N 19/51
348/699
6,020,933 A * 2/2000 Lee ......................... H04N 19/51
348/699

(Continued)

FOREIGN PATENT DOCUMENTS

| CN | 100459658 C | 2/2009 |
| TW | 200603636 A | 1/2006 |

OTHER PUBLICATIONS

Official Communication issued in corresponding Taiwanese Patent Application No. 100112794, mailed on Sep. 29, 2014.
(Continued)

*Primary Examiner* — Jay Patel
*Assistant Examiner* — Neil Mikeska
(74) *Attorney, Agent, or Firm* — Keating & Bennett, LLP

(57) ABSTRACT

A video decoder using motion-compensated prediction has a predictor configured to predict a first subset of parameters of a plurality of motion parameters, defining the motion-compensated prediction of a predetermined region of a picture of a video, to obtain a prediction for the first subset. The video decoder further has a reconstructor configured to reconstruct the first subset of parameters from the prediction of the first subset and residual information for the first subset contained in a data stream, to obtain a reconstruction of the first subset. The predictor is further configured to predict a second subset of parameters of the plurality of motion parameters, being disjoint from the first subset, using the reconstruction of the first subset.

12 Claims, 9 Drawing Sheets

(51) Int. Cl.
  *H04N 19/52* (2014.01)
  *H04N 19/51* (2014.01)
  *H04N 19/57* (2014.01)
  *H04N 19/30* (2014.01)

(56) References Cited

U.S. PATENT DOCUMENTS

| | | | | |
|---|---|---|---|---|
| 6,278,736 | B1 * | 8/2001 | De Haan | H04N 5/144 348/E5.065 |
| 8,116,372 | B1 * | 2/2012 | Amer | H04N 19/176 375/240.01 |
| 8,488,889 | B2 * | 7/2013 | Moriya | H04N 19/56 382/232 |
| 9,071,844 | B2 * | 6/2015 | Osamoto | H04N 19/51 |
| 2005/0053148 | A1 * | 3/2005 | Mukerjee | H04N 19/0003 375/240.16 |
| 2005/0058201 | A1 * | 3/2005 | Fernandes | H04N 19/56 375/240.16 |
| 2005/0129124 | A1 * | 6/2005 | Ha | H04N 19/513 375/240.16 |
| 2006/0083308 | A1 * | 4/2006 | Schwarz | H04N 19/0003 375/240.16 |
| 2006/0083309 | A1 | 4/2006 | Schwarz et al. | |
| 2006/0133475 | A1 * | 6/2006 | Bruls | H04N 19/56 375/240.1 |
| 2006/0176957 | A1 | 8/2006 | Han et al. | |
| 2006/0269153 | A1 * | 11/2006 | Shi | H04N 19/56 382/236 |
| 2006/0280248 | A1 * | 12/2006 | Kim | H04N 21/234309 375/240.16 |
| 2007/0154103 | A1 * | 7/2007 | Au | H04N 19/56 382/236 |
| 2007/0211802 | A1 | 9/2007 | Kikuchi et al. | |
| 2008/0008245 | A1 * | 1/2008 | Kondo | H04N 7/0112 375/240.16 |
| 2008/0144720 | A1 * | 6/2008 | Etoh | H04N 9/8042 375/240.16 |
| 2008/0260033 | A1 * | 10/2008 | Austerlitz | H04N 19/56 375/240.16 |
| 2009/0116558 | A1 * | 5/2009 | Chen | H04N 19/597 375/240.16 |
| 2010/0020244 | A1 | 1/2010 | Mitsuya et al. | |
| 2011/0211640 | A1 * | 9/2011 | Kim | H04N 19/52 375/240.16 |
| 2011/0221865 | A1 * | 9/2011 | Hyndman | G06T 15/00 348/43 |
| 2015/0016527 | A1 * | 1/2015 | Tourapis | H04N 19/56 375/240.15 |
| 2015/0036749 | A1 * | 2/2015 | Jeon | H04N 19/55 375/240.16 |

OTHER PUBLICATIONS

Official Communication issued in International Patent Application No. PCT/EP2011/055504, mailed on Jun. 16, 2011.

Wiegand et al., "Entropy-Constrained Design of Quadtree Video Coding Schemes", Conference Publication No. 443 IEE, IPA 97, Jul. 1997, pp. 36-40.

* cited by examiner

VIDEO DECODER AND A VIDEO ENCODER USING MOTION-COMPENSATED PREDICTION

CROSS-REFERENCE TO RELATED APPLICATIONS

This application is a continuation of copending International Application No. PCT/EP2011/055504, filed Apr. 8, 2011, which is incorporated herein by reference in its entirety, and additionally claims priority from International Application No. PCT/EP2010/054837, filed Apr. 13, 2010, and European Application No. EP 10159808, filed Apr. 13, 2010, all of which are incorporated herein by reference in their entirety.

BACKGROUND OF THE INVENTION

One of the most important concepts in state-of-the-art video coding standards and algorithms is the so-called motion-compensated prediction. The pictures (or color components of pictures) of a video sequence are decomposed into regions. In general, these regions can have arbitrary shapes, but usually the regions represent quadratic or rectangular blocks. For the following description, only rectangular or quadratic blocks are considered; but the described concepts can be extended to arbitrary shaped regions in a straightforward way. The blocks of a picture can have variable sizes, i.e., different blocks in the same picture can have different sizes. The partitioning into blocks is often signaled inside the bitstream. For each block, it is decided whether it is intra-coded (i.e., without referring to already coded pictures in the video sequences) or whether it is inter-coded (i.e., with using already coded pictures for prediction). If a block is intra-coded, it is usually predicted using the reconstructed samples of already coded neighboring blocks inside the same picture. Inter-coded blocks are predicted using reconstructed samples of already coded pictures inside the video sequence. The prediction signal is generated by copying and potentially filtering the samples of one or more picture regions in already coded pictures. The one or more already coded pictures that are used for generating the inter-prediction signal, which are also referred to as reference pictures, are often signaled using so-called reference picture indices, which are either transmitted for each inter-coded block or are inferred (possibly based on certain high-level syntax elements). In addition, one or more motion parameter vectors are transmitted for a block, which specify the region in the reference pictures that are used for prediction and the filtering that is applied for generating the prediction signal. As a typical example, the motion parameters are represented by a displacement vector consisting of a horizontal and vertical component. The displacement vector components can have sub-sample accuracy. If the displacement vector has full-sample accuracy, it identifies a block in the reference picture, and the samples of this block are used as prediction signal for the current block, or the samples of the reference block are filtered to generate the prediction signal for the current block. In general, the displacement vectors have sub-sample accuracy, and then the reference blocks are additionally interpolated (depending on the sub-sample position) for generating the prediction signal for the current block. In this case, the displacement vector can also be interpreted as consisting of a full-sample part, which specifies the reference blocks, and a sub-sample part, which specifies the filtering of the reference block for generating the prediction signal. The motion parameters can also represent motion parameter vectors with more then two components. As an example, a higher order motion model as the affine motion model could be used for describing the motion of the current block between the reference picture and the current picture. In case of the affine motion model, a motion parameter vector consists of six components. But any other motion model with a particular number of motion parameter vector components could be employed. Since the prediction for inter-coded blocks is specified by a modeled motion of the current block relative to a reference picture, this type of prediction is often referred to as motion-compensated prediction. The final prediction signal for a block can also be generated by a superposition of two or more motion-compensated prediction signals. Each of the prediction signals is obtained as described above and the final prediction signal is generated by a weighted sum of the corresponding motion-compensated prediction signals. For both intra-coded and inter-coded blocks, the residual signal representing the difference between the original samples of a block and the samples of the prediction signal for a block is usually coded using transform coding. A two-dimensional transform is applied to the residual signal, the transform coefficients are quantized, and the resulting transform coefficient levels are entropy coded. The side information for a block, which may include the block partitioning information, the block coding modes (e.g., specifying whether the block is intra-coded or inter-coded and, if inter-coded, the number of motion-compensated prediction signals that are superposed), the intra-prediction modes, the reference picture indices, and the motion parameter vectors, is also included in the bitstream.

The side information rate related to motion parameter vectors can represent a significant amount of the overall bit rate. In order to reduce the side information rate, the motion parameter vectors of a current block are usually predicted using the motion parameter vectors of neighboring blocks of the current block. Only the differences between the predicted motion parameter vectors and the actual motion parameter vectors are transmitted.

SUMMARY

According to an embodiment, a video decoder using motion-compensated prediction may have a predictor configured to predict a first subset of parameters of a plurality of motion parameters defining the motion-compensated prediction of a predetermined region of a picture of a video to acquire a prediction for the first subset; a reconstructor configured to reconstruct the first subset of parameters from the prediction for the first subset and residual information for the first subset contained in a data stream, to acquire a reconstruction of the first subset, wherein the predictor is configured to predict a second subset of parameters of the plurality of motion parameters, being disjoint from the first subset using the reconstruction of the first subset, to acquire a prediction for the second subset.

According to another embodiment, a video decoder using motion-compensated predictions may have a predictor configured to predict a first subset of parameters of a plurality of motion parameters defining the motion-compensated prediction of a predetermined region of a picture of a video to acquire a prediction for the first subset; and a reconstructor configured to reconstruct the first subset of parameters from the prediction for the first subset and from first residual information for the first subset contained in a data stream to acquire a reconstruction of the first subset; wherein the predictor is configured to predict a second subset of parameters of the plurality of parameters, being disjoint from the first subset to acquire a prediction for the second subset; wherein the reconstructor is configured to reconstruct the second subset of parameters from the prediction for the second subset and second residual information for the second subset contained in the data stream; and wherein the reconstructor is configured to acquire the first residual information for the first subset and the second residual information for the second subset from the data stream using entropy decoding using a probability estimation, and to adapt the probability estimation for entropy decoding the second residual information for the second subset using the reconstruction of the first subset.

According to another embodiment, a video encoder using motion-compensated prediction may have a predictor configured to predict a first subset of parameters of a plurality of motion parameters, defining the motion-compensated prediction of a predetermined region of a picture, to acquire a prediction for the first subset; and a residual information determiner configured to determine a first residual information for the first subset, using the prediction for the first subset, wherein the predictor is further configured to predict a second subset of parameters of the plurality of motion parameters, being disjoint from the first subset, using the first subset, to acquire a prediction for the second subset.

According to another embodiment, a video encoder using motion-compensated prediction may have a predictor configured to predict a first subset and a second subset of parameters of a plurality of motion parameters determining the motion-compensated prediction of a predetermined region of a picture, the first subset being disjoint from the second subset, to acquire a prediction for the first subset and a prediction for the second subset; and a residual information determiner configured to determine a first entropy encoded residual information for the first subset and a second entropy encoded residual information for the second subset, using a probability estimation, and to adapt the probability estimation for entropy encoding a second residual information for the second subset using the first subset.

According to another embodiment, a method for reconstructing motion parameters may have the steps of predicting a first subset of parameters of a plurality of motion parameters, defining the motion-compensated prediction of a predetermined region of a picture of a video to acquire a prediction for the first subset; reconstructing the first subset of parameters from the prediction for the first subset and from a residual information for the first subset contained in a data stream, to acquire a reconstruction of the first subset; and predicting a second subset of parameters of a plurality of motion parameters, being disjoint from the first subset using the reconstruction of the first subset.

According to another embodiment, a method for reconstructing motion parameters may have the steps of predicting a first subset of parameters of a plurality of motion parameters defining the motion-compensated prediction of a predetermined region of a picture of a video to acquire a prediction for the first subset; acquiring first residual information for the first subset from a data stream using entropy decoding using a probability estimation; reconstructing the first subset of parameters from the prediction for the first subset and from the first residual information for the first subset contained in the data stream, to acquire a reconstruction of the first subset; predicting a second subset of parameters of the plurality of parameters being disjoint from the first subset to acquire a prediction for the second subset; adapting the probability estimation for entropy decoding second residual information for the second subset using the reconstruction for the first subset; acquiring the second residual information from the data stream using entropy decoding using the adapted probability estimation; and reconstructing the second subset of parameters from the prediction for the second subset and from the second residual information for the second subset.

According to another embodiment, a video decoder using motion-compensated prediction may have a predictor configured to predict a first subset of parameters of a plurality of motion parameters defining the motion-compensated prediction of a predetermined region of a picture of a video to acquire a prediction for the first subset; a reconstructor configured to reconstruct the first subset of parameters from the prediction for the first subset and residual information for the first subset contained in a data stream, to acquire a reconstruction of the first subset, wherein the predictor is configured to predict a second subset of parameters of the plurality of motion parameters, being disjoint from the first subset using the reconstruction of the first subset, to acquire a prediction for the second subset, wherein the plurality of motion parameters form a motion parameter vector with two or more components, wherein the first subset is a first component of the motion parameter vector or a first list of components of the motion parameter vector and the second subset is a second component or a second list of components of the motion parameter vector.

According to another embodiment, a video decoder using motion-compensated prediction may have a predictor configured to predict a first subset of parameters of a plurality of motion parameters defining the motion-compensated prediction of a predetermined region of a picture of a video to acquire a prediction for the first subset; a reconstructor configured to reconstruct the first subset of parameters from the prediction for the first subset and residual information for the first subset contained in a data stream, to acquire a reconstruction of the first subset, wherein the predictor is configured to predict a second subset of parameters of the plurality of motion parameters, being disjoint from the first subset using the reconstruction of the first subset, to acquire a prediction for the second subset, wherein the predictor is configured to determine a first candidate set of previously decoded motion information, each motion information defining a plurality of motion parameters defining the motion-compensated prediction for a region neighboring the predetermined region or defining a motion-compensated prediction for the predetermined region in a previously decoded picture, to acquire the prediction for the first subset, and wherein the predictor is configured to select a second candidate set as a subset of the first candidate set of previously decoded motion information based on the reconstruction of the first subset, and to acquire the prediction for the second subset using the second candidate set.

According to another embodiment, a video encoder using motion-compensated prediction may have a predictor configured to predict a first subset of parameters of a plurality of motion parameters, defining the motion-compensated prediction of a predetermined region of a picture, to acquire a prediction for the first subset; and a residual information determiner configured to determine a first residual information for the first subset, using the prediction for the first subset, wherein the predictor is further configured to predict a second subset of parameters of the plurality of motion parameters, being disjoint from the first subset, using the first subset, to acquire a prediction for the second subset; and wherein the plurality of motion parameters form a motion parameter vector having two or more components, wherein the first subset is a first component of the motion parameter vector or a first list of components of the motion parameter vector and the second subset is a second component or a second list of components of the motion parameter vector.

According to another embodiment, a video encoder using motion-compensated prediction may have a predictor configured to predict a first subset of parameters of a plurality of motion parameters, defining the motion-compensated prediction of a predetermined region of a picture, to acquire a prediction for the first subset; and a residual information determiner configured to determine a first residual information for the first subset, using the prediction for the first subset, wherein the predictor is further configured to predict a second subset of parameters of the plurality of motion parameters, being disjoint from the first subset, using the first subset, to acquire a prediction for the second subset; wherein the predictor is configured to determine a first candidate set of previously encoded motion information, each motion information defining a plurality of motion parameters defining the motion-compensated prediction for a region neighboring the predetermined region or defining a motion-compensated prediction for the predetermined region in a previously encoded picture, to acquire the prediction for the first subset; and wherein the predictor is configured to select a second candidate set as a subset of the first candidate set of previously encoded motion information based on the first subset, and to acquire the prediction for the second subset using the second candidate set.

According to another embodiment, a method for reconstructing motion parameters may have the steps of predicting a first subset of parameters of a plurality of motion parameters, defining the motion-compensated prediction of a predetermined region of a picture of a video to acquire a prediction for the first subset; reconstructing the first subset of parameters from the prediction for the first subset and from a residual information for the first subset contained in a data stream, to acquire a reconstruction of the first subset; and predicting a second subset of parameters of a plurality of motion parameters, being disjoint from the first subset using the reconstruction of the first subset; wherein the plurality of motion parameters form a motion parameter vector having two or more components, wherein the first subset is a first component of the motion parameter vector or a first list of components of the motion parameter vector and the second subset is a second component or a second list of components of the motion parameter vector.

According to another embodiment, a method for reconstructing motion parameters may have the steps of predicting a first subset of parameters of a plurality of motion parameters, defining the motion-compensated prediction of a predetermined region of a picture of a video to acquire a prediction for the first subset, by determining a first candidate set of previously decoded motion information, each motion information defining a plurality of motion parameters defining the motion-compensated prediction for a region neighboring the predetermined region or defining a motion-compensated prediction for the predetermined region in a previously decoded picture, to acquire the prediction for the first subset; reconstructing the first subset of parameters from the prediction for the first subset and from a residual information for the first subset contained in a data stream, to acquire a reconstruction of the first subset; and predicting a second subset of parameters of a plurality of motion parameters, being disjoint from the first subset using the reconstruction of the first subset, by selecting a second candidate set as a subset of the first candidate set of previously encoded motion information based on the reconstruction of the first subset, and by acquiring the prediction for the second subset using the second candidate set.

According to another embodiment, a computer readable digital storage medium may have stored thereon a computer program having a program code for performing, when running on a computer, one of the above mentioned methods.

According to a first aspect of the present invention, some embodiments of the present invention provide a video decoder using motion-compensated prediction. The video decoder has a predictor and a reconstructor. The predictor is configured to predict a first subset of parameters of a plurality of motion parameters, defining the motion-compensated prediction of a predetermined region of a picture of a video to obtain a prediction for the first subset. The reconstructor is configured to reconstruct the first subset of parameters from the prediction for the first subset and from residual information for the first subset, contained in a data stream (into which the video is coded), to obtain a reconstruction of the first subset. The predictor is further configured to predict a second subset of parameters of the plurality of parameters using the reconstruction of the first subset. The second subset is disjoint from the first subset.

According to a second aspect of the present invention, some embodiments provide a video decoder using motion-compensated prediction. The video decoder comprises a predictor and a reconstructor. The predictor is configured to predict a first subset of parameters of a plurality of motion parameters defining the motion-compensated prediction of a predetermined region of a picture of a video to obtain a prediction for the first subset. The reconstructor is configured to reconstruct the first subset of parameters from the prediction for the first subset and from first residual information for the first subset, contained in a data stream (into which the video is coded), to obtain a reconstruction of the first subset. The predictor is further configured to predict a second subset of parameters of the plurality of parameters, which is disjoint from the first subset to obtain a prediction for the second subset. The reconstructor is further configured to reconstruct a second subset of parameters from the prediction for the second subset and from the second residual information for the second subset, contained in the data stream. Furthermore, the reconstructor is configured to obtain the first and second residual information from the data stream using entropy decoding using a probability estimation. The reconstructor is configured to adapt the probability estimation for entropy decoding the second residual information using the reconstruction of the first subset.

It is an idea of the present invention that a more efficient transmission of side information related to motion compensation can be achieved, if a prediction for a subset of parameters of a plurality of motion parameters determining a motion prediction and/or a residual information for the subset, defining the difference between the prediction of the subset and the actual subset, are/is determined depending on another prediction and/or residual information for another subset of parameters from the same plurality of motion parameters like the subset. It has been found that determining a prediction for a subset and/or a residual information for the subset based on a reconstruction of another subset for the same plurality of motion parameters, the size of the residual information for the subset is reduced compared to concepts, in where predictions and residual information of different subsets of parameters for a plurality of motion parameters determining a motion prediction for a block of a picture or for a picture are determined independent from each other.

The above mentioned idea is employed in embodiments according to the first aspect of the present invention by determining the prediction for the second subset by using the reconstruction of the first subset.

In embodiments according to the second aspect of the present invention, the above mentioned idea is employed by adapting the probability information for the entropy decoding of the residual information for the second subset, based on the reconstruction of the first subset.

Therefore, in contrast to the standard technology, a prediction and reconstruction of motion parameters, determining a motion-compensated prediction for a region of a picture is interleaved, which means a reconstruction of the first subset of parameters is determined before a reconstruction of the second subset is determined and is used for the reconstruction of the second subset. As mentioned above, in commonly known video coding systems, there is no dependency between the reconstruction of the first subset and a determination of the reconstruction of the second subset.

BRIEF DESCRIPTION OF THE DRAWINGS

Embodiments of the present invention will be explained in more detail with reference to the accompanying figures, wherein.

DETAILED DESCRIPTION OF THE INVENTION

Figure 1:
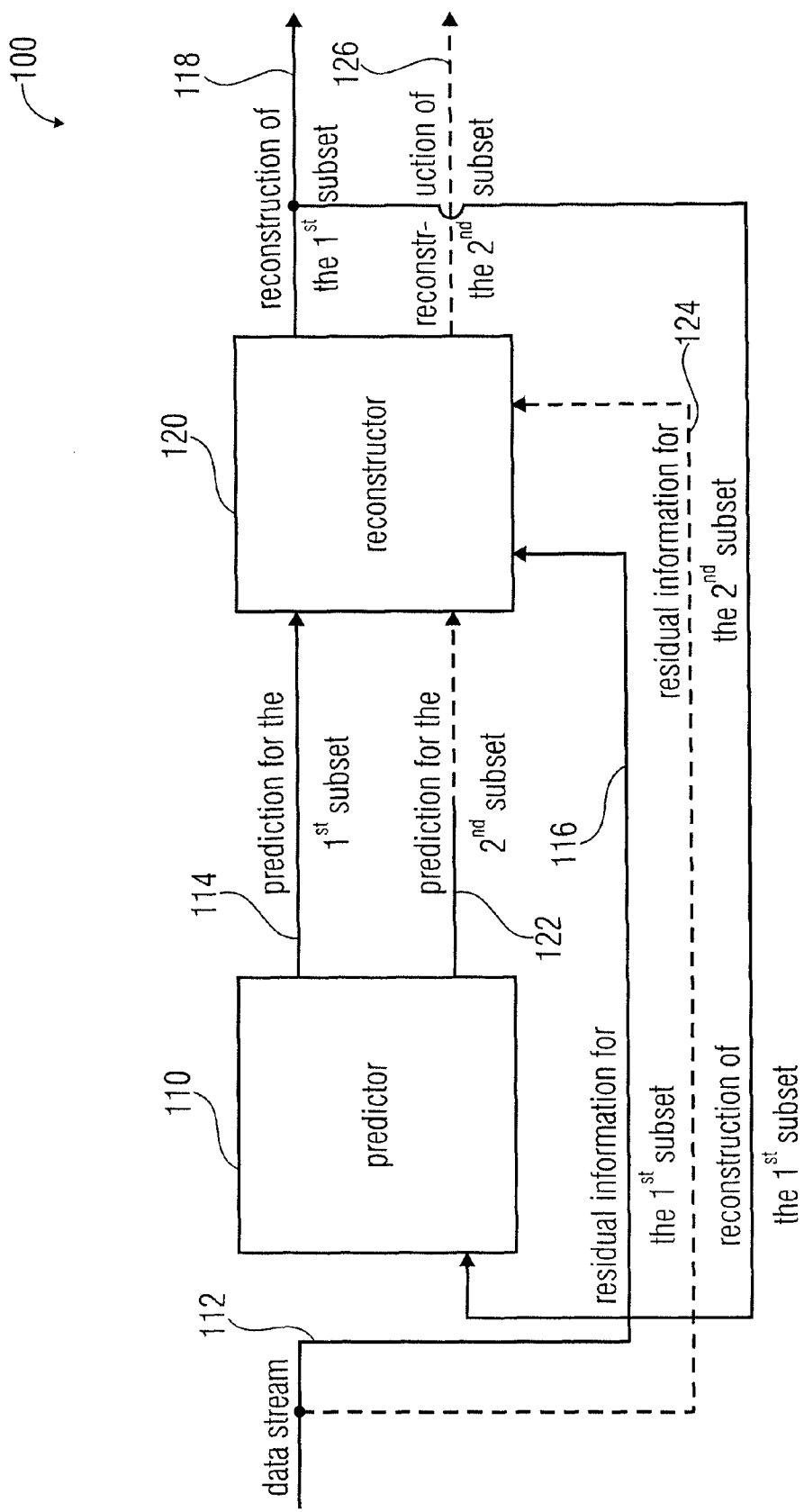
FIG. 1 shows a block diagram of a video decoder according to an embodiment according to the first aspect of the present invention.

Before embodiments of the present invention will be explained in further detail in the following on the basis of the figures, it is to be pointed out that the same or functionally equal elements are provided with the same reference numerals in the figures and that a repeated description of these elements shall be omitted. Hence, the description of the elements provided with the same reference numerals is mutually interchangeable and/or applicable in the various embodiments.

FIG. 1 shows a block diagram of a video decoder 100 using motion prediction according to an embodiment according to the first aspect of the present invention. The video decoder 100 comprises a predictor 110 and a reconstructor 120. The predictor 110 is configured to predict a first subset of parameters of a plurality of motion parameters to obtain a prediction 114 for the first subset of parameters. The plurality of motion parameters define the motion-compensated prediction of a predetermined region of a picture of a video. The predetermined region of the picture may, for example, be a block of a picture, for example a macro block which may be quadratic or rectangular or may have an arbitrary shape.

The reconstructor 120 is configured to reconstruct the first subset of parameters from the prediction 114 for the first subset and residual information 116 for the first subset contained in a data stream 112, to obtain a reconstruction 118 of the first subset. The residual information 116 for the first subset determines a difference between the prediction 114 for the first subset and the first subset. The reconstructor 120 is therefore combining the prediction 114 for the first subset with the residual information 116 for the first subset to obtain the reconstruction 118 of the first subset.

The predictor 110 is further configured to predict a second subset of parameters of the plurality of motion parameters using the reconstruction 118 of the first subset, to obtain a prediction 122 for the second subset.

As it is shown in FIG. 1 with dashed lines, the reconstructor 120 may further be configured to reconstruct the second subset of parameters from the prediction 122 for the second subset and a residual information 124 for the second subset contained in the data stream 112 to obtain a reconstruction 126 of the second subset.

The plurality of motion parameter defining the motion-compensated prediction of the predetermined region of the picture of the video may also be designated as a motion parameter vector. A motion parameter vector may contain two or more components. The first subset may, for example, be one component of the motion parameter vector or a subset of the components of the motion parameter vector and the second subset may, for example, be another component or another subset of the components of the motion parameter vector. For example, a motion parameter vector may be a displacement vector with a horizontal and a vertical component. The first subset may therefore be, for example, the vertical component and the second subset may, for example, be the horizontal component or vice versa. According to some embodiments, a component of a motion parameter vector may also be a reference picture index.

As mentioned before, the first subset is disjoint from the second subset, therefore also different components of a motion parameter vector are disjoint from each other.

In other words, according to some embodiments, the predictor 110 may be configured such that the first subset determines a coordinate for a first direction and the second subset lacks a coordinate for the first direction or the first subset determines a reference picture index with the second subset lacking a reference picture index or the second subset determines a reference picture index with the first subset lacking a reference picture index.

According to some embodiments, the video decoder 100 may further comprise an image sample reconstructor. The image sample reconstructor may be configured to predict the predetermined region of the picture of the video by applying the reconstruction 118 of the first subset and the reconstruction 126 of the second subset to an already reconstructed picture of the video, to obtain a prediction of the predefined region. Hence, the motion parameters specify the motion-compensated prediction for the predetermined region of the current picture by referencing at least one already reconstructed picture of the video. One of the parameters of the motion parameters may, for example, determine a reference index or a list of reference indices, which determine to which of the already reconstructed pictures the plurality of the motion parameters refer to. The image sample reconstructor may be further configured such that the way in which the reconstruction 118 of the first subset influences the prediction of the predetermined region is different from the way in which the reconstruction 126 of the second subset influences the prediction of the predetermined region, and such that image samples of the prediction of the predetermined region are dependent on both, the first subset and the second subset. In other words, a sample of the prediction of the predetermined region of the picture may be dependent on all parameters of the plurality of motion parameters, and therefore on the first subset and the second subset, defining the motion-compensated prediction of the predetermined region of the picture. As an example, if the plurality of motion parameters define a translational vector, wherein the first subset is a horizontal component and the second subset is a vertical component, the first subset determines a movement of a sample of the predetermined region in the horizontal direction, and the second subset determines the movement of the sample in the vertical direction, to obtain the predicted position of the sample inside the reference picture (with the translational motion vector referring to the reference picture).

Figure 2:
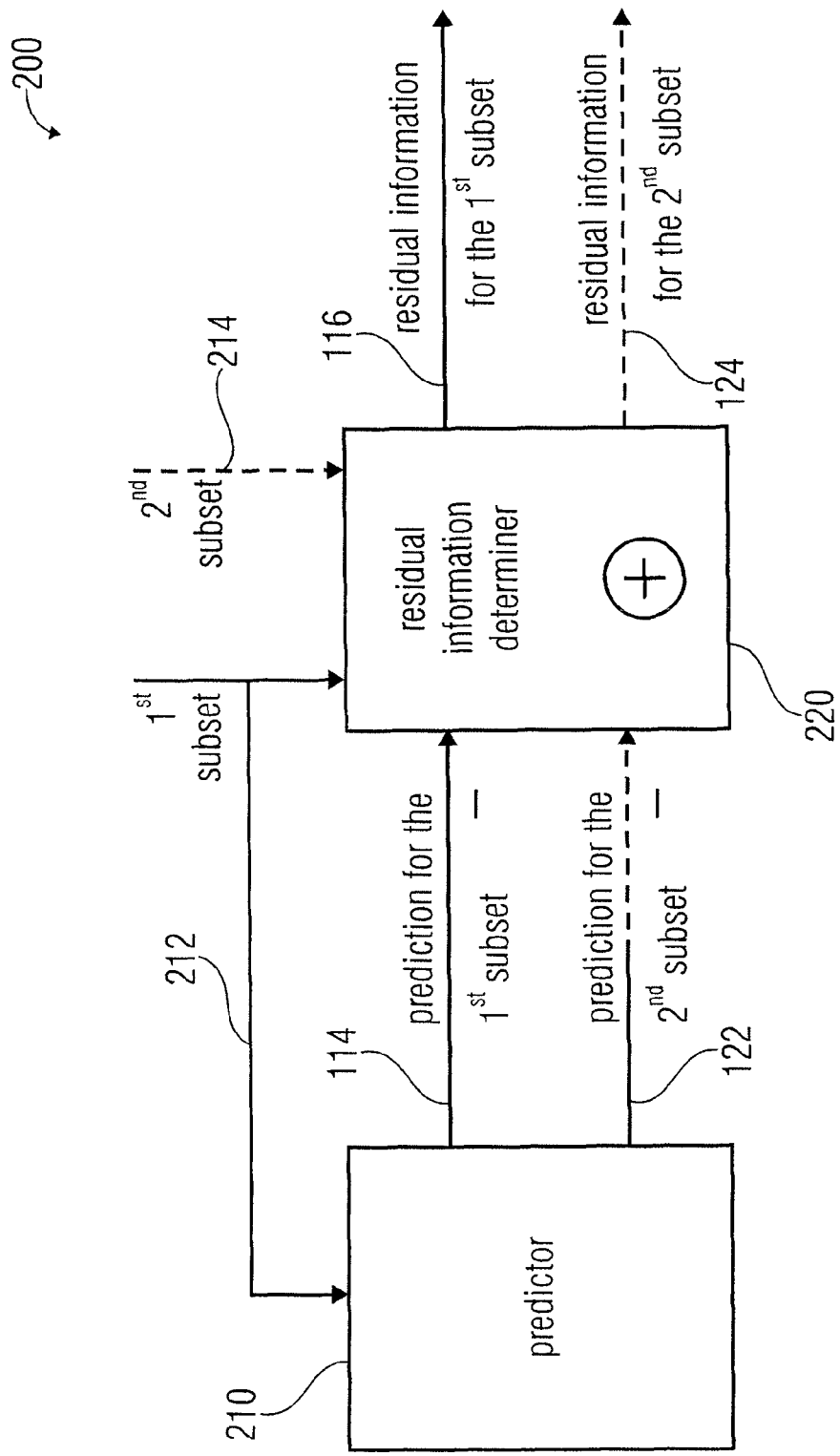
FIG. 2 shows a block diagram of a video encoder according to an embodiment according to the first aspect of the present invention.

FIG. 2 shows a block diagram of a hybrid video encoder 200 according to an embodiment according to the first aspect of the present invention. The video encoder 200 comprises a predictor 210 and a residual information determiner 220. The predictor 210 is configured to predict a first subset 212 of parameters of a plurality of motion parameters, defining the motion-compensated prediction of a predetermined region of a picture, to obtain a prediction 114 for the first subset 212. The residual information determiner 220 is configured to determine a residual information 116 for the first subset 212, using the prediction 114 for the first subset 212. The predictor 210 is further configured to predict a second subset 214 of parameters of the plurality of motion parameters, using the first subset 212, to obtain a prediction 122 for the second subset 214. The first subset 212 is disjoint from the second subset 214. According to some embodiments, as it is shown in FIG. 2 with dashed lines, the residual information determiner may further be configured to determine a residual information 124 for the second subset 214 using the prediction 122 for the second subset 214 and the second subset 214. The plurality of motion parameters defining the motion-compensated prediction of the predetermined region of the picture may, as it has been described before, form a motion parameter vector with two or more components. The first subset 212 may, for example, be a first component or a first list of components of the motion parameter vector and the second subset 214 may be a second component or a second list of components of the motion parameter vector. By determining the prediction 122 for the second subset 214 not only based on subsets of previously coded motion parameters of previously coded regions (as this is done in the commonly known video coding systems), but also on previously coded motion parameters (in the decoder 100 the reconstruction 118 of the first 212 subset is used for determining the prediction 122 for the second subset 214) for the same region, a size of the residual information 124 for the second subset 214 can be reduced compared to the commonly known video coding systems, therefore resulting in a reduced motion information rate, which increases the coding efficiency for motion-compensated video coding. In other words, the reduced motion information rate is achieved by considering the dependencies between the different components of a motion parameter vector or, in other words, by considering the dependencies between the parameters of a plurality of motion parameters defining the motion-compensated prediction of a predetermined region of a picture.

Figure 3:
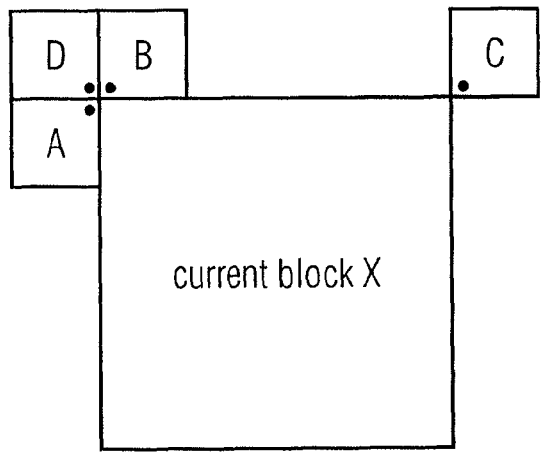
FIG. 3 shows an example for the selection of neighboring blocks for motion parameter prediction.

As mentioned before, the plurality of motion parameters may represent a motion parameter vector. This motion parameter vector may be a displacement vector, determining the displacement of the predetermined region of a current picture inside a previously encoded or decoded reference picture. In the following, a displacement vector prediction is explained based on the motion vector prediction of H.264, where each motion parameter vector is a displacement vector with a horizontal and vertical component. For predicting the motion (or displacement) vector of a current block, up to three motion vector candidates are selected as illustrated in FIG. 3.

In H.264, the motion vector candidates are basically selected as follows. The first candidate is the motion vector of the block A that contains the left neighbor sample of the top-left sample of the current block X. The second candidate is the motion vector of the block B that contains the top neighbor sample of the top-left sample of the current block X. And the third candidate is the motion vector of the block C that contains the top-right neighbor sample of the top-right sample of the current block X. If the block C is not available, e.g. because it lies outside the current slice or it hasn't been coded before the current block X, the third candidate is replaced by the motion vector of the block D that contains the top-left neighbor sample of the top-left sample of the current block X. If more than one motion vector is associated with a block, one of the motion vectors is selected based on a certain criterion. Depending on the availability of the candidate motion vectors, the type/size of the current block X, and the association of the candidate motion vectors with reference picture indices in comparison to the reference picture index for the current block, one of the candidates might be used as predictor for the motion vector of the current block. But in the general case, the predictor for the current motion vector is derived as median of the three candidate motion vectors. More accurately, each component of the motion vector predictor is set equal to the median of the corresponding components of the three candidate motion vectors.

As a numeric example, considering a case, where an object boundary coincides with the top boundary of the current block X. The blocks B and C represent the same object; the motion vectors are similar and shall be mvB=(−2, −1) and mvC=(−3, 0) for the numeric example. Furthermore, the block A and the current block X represent the same object but a different object than the blocks B and C. The corresponding motion vectors shall be mvA=(9, 6) and mvX=(8, 6). The motion vectors mvA and mvX (the motion vector of the current block X) are similar, but significantly different to the motion vectors mvB of the block B and mvC of the block C. If we apply a median prediction of the components, the motion vector prediction for the current block X would be derived to mvP (median)=(−2, 0). The motion vector difference (a residual information for the motion vector) that would have to be transmitted is mvD (median)=(10, 6). Both components of the motion vector difference (a residual information for the horizontal component and a residual information for the vertical component) are relatively large, needing a significant number of bits. As it has been shown, the prediction for each component (for the horizontal component and the vertical component) of the motion vector of the current block X is independent of the prediction for the other component of the motion vector of the current block X. In other words, in standard technology dependencies between components of a motion vector of a region of a picture of a block are neglected.

Embodiments of the present invention consider the dependencies between different components of a motion vector for a predetermined region of a picture. It has been found that often the motion vector (or generally, the motion parameter vector or the plurality of the motion parameters) of the current block X (or of a predetermined region of a picture) is very similar to at least one of the motion vectors (or motion parameter vectors or plurality of motion parameters) for already coded neighboring blocks of the current blocks X (or already coded neighboring regions of the predetermined region of the picture). It has been found that this observation corresponds to the fact that a real image consists of moving objects, and if two blocks or regions represent picture regions that belong to the same object, the motion vectors (the plurality of motion parameters) should be similar. The median predictor as it is used in standard technology does not necessarily represent the best predictor that can be generated, since it neglects the dependencies between the motion vector components (between the subsets of the plurality of motion parameters). Embodiments of the present invention can reduce the number of bits needed for transmitting the motion vectors (or the residual information for the motion vectors) by considering the dependencies between the motion vector components (between the subsets of parameters of the plurality of motion parameters).

In the following an example should be given on how the motion vector prediction of the above mentioned numerical example may be employed in some embodiments of the present invention. This motion parameter vector prediction may be employed in the video decoder 100 according to FIG. 1 and the video encoder 200 according to FIG. 2. It is assumed that one of the candidate motion vectors (motion vectors of blocks neighboring the current block for which the motion parameter vector prediction is to be done) is similar to the current motion vector (the motion vector of the current block), but it is not known which one. In order to reduce the uncertainty, first one motion vector component (for example the prediction 114 for the first subset 212) may be predicted and the corresponding difference (for example the residual information 116 for the first subset 212) may be coded in the encoder. The current value of the motion vector component (of the first subset 212) can also be reconstructed at the decoder side (for example as the reconstruction 118 of the first subset 212). Given the already coded component (for example the reconstruction 118 of the first subset 212), the number of candidate motion vectors for predicting the other motion vector component (for example the prediction 122 for the second subset 214) may be reduced (for example it may be reduced to one candidate motion vector). The other motion vector component (for example the prediction 122 for the second subset 214) will then be predicted using the remaining motion vector candidate or motion vector candidates. For the above, given numerical example, first the vertical component may be predicted (vertical motion vector components are often more consistent throughout the picture, since most motions are mainly in horizontal direction). This vertical component could be predicted using the median prediction as described before (e.g. as in the H.264 standard). This would lead to a prediction for the motion vector component for the vertical direction $mvP_Y(new)=0$ for the current block X, which gives the same result as in standard technology. The corresponding difference component (for example the residual information 116 for the first subset 212) would be equal to $mvD_Y(new)=6$ as in the standard technology coding technique. However, with embodiments of the present invention, the side information rate for the remaining (horizontal) component (the side information rate for the residual information 124 for the second subset 212) could be reduced. Given the vertical component $mvX_Y=6$ (which is in the encoder 200 determined from the first subset 212 and in the decoder 100 is determined from the reconstruction 118 of the first subset 212) of the current motion vector (of the plurality of the motion parameter), the motion vector or the motion vectors that has or have the smallest difference in the vertical component may be chosen as candidate or candidates for predicting the horizontal component of the motion vector. In the numerical example, this would be the motion vector $mvA=(9,6)$. Then the horizontal component (the second subset) of this motion (parameter) vector is chosen as prediction for the horizontal component (as prediction 122 for the second subset 214) of the current motion vector, using a prediction for the horizontal component (the prediction 122 for the second subset 214) of $mvP_X(new)=9$ and a difference vector (or a residual information 124 for the second subset 214) of $mvD_X(new)=-1$. Finally, the difference motion vector mvD $(new)=(-1,6)$ is smaller than the difference vector (which was in the numerical example $mvD(median)=(10,6)$ for the commonly known median prediction, which is used in the H.264 video coding standard. Therefore, the corresponding bit rate for the current motion vector (comprising the residual information 116 for the first subset 212 and the residual information 124 for the second subset 214) may be reduced and the coding efficiency may be increased. According to further embodiments, it is also possible to first predict the horizontal component in which, using the numerical example, one would obtain $mvP(new2)=(-2,6)$ and $mvD(new)=(10,0)$, which is also smaller than the independent median prediction, described before.

According to further embodiments this concept may also be extended to higher-order motion models in which a motion parameter vector contains more than two components (more than two parameters). As explained above, an advantage of embodiments of the present invention is a reduced side information rate, which increases the coding efficiency for motion-compensated video coding. The reduced motion information rate is achieved by considering the dependencies between the different components of a motion parameter vector, defining the motion-compensated prediction of the predetermined region of a picture or of a picture.

Figure 4:
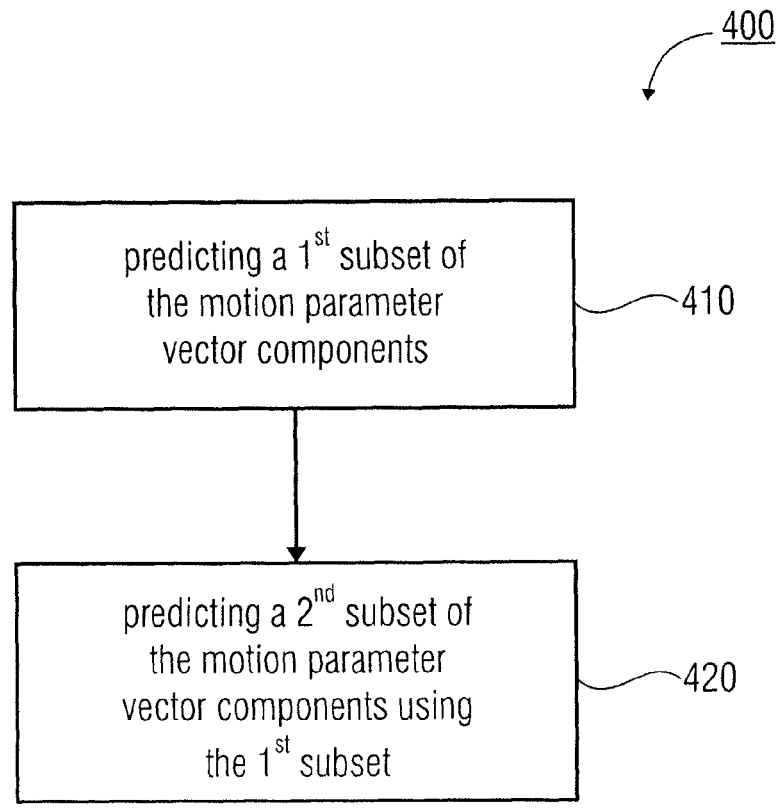
FIG. 4 shows a flow diagram of a method according to an embodiment according to the first aspect of the present invention.

Embodiments of the present invention therefore create a concept for motion parameter vector prediction and motion parameter vector coding in video coding applications, which enables a significant reduction in side information rate, related to the motion parameter vector prediction. A motion parameter vector containing two or more components of a current block or picture region is predicted using already coded motion parameter vectors of neighboring blocks or picture region. According to some embodiments of the present invention the prediction encoding of the motion parameter vector components of the current motion parameter vector is interleaved as described in a method 400 shown in FIG. 4. The prediction and encoding of a motion parameter vector (of a plurality of motion parameters defining a motion-compensated prediction of a predetermined region of a picture) consists of at least two steps of the method 400. In a first step 410 of the method 400, a first subset of the motion parameter vector components (which may consist of a single motion parameter vector component) is predicted using the corresponding motion parameter components of two or more motion parameter vectors of neighboring blocks or picture regions or of two or more motion parameter vectors from the same region of a previously encoded/decoded picture; or a first subset of the motion parameter vector components (which may consist of a single motion parameter vector component) is predicted using the corresponding motion parameter components of one or more motion parameter vectors of neighboring blocks or picture regions and of one or more motion parameter vectors from the same region of a previously encoded/decoded picture. At the encoder side the corresponding differences (between the actual motion parameter vector component and the predictions) are determined and inserted into a data stream. In other words, at the encoder side, for example at the encoder 200 the residual information determiner 220 determines the residual information 116 for the first subset 212, which determines a difference between the prediction 114 for the first subset 212 and the first subset 212. The residual information 116 for the first subset 212 is transmitted to a decoder (for example to the decoder 100 according to FIG. 1). As mentioned before the prediction for the proper subset (the prediction 114 for the first subset 212) may be obtained based on motion parameters of motion parameter vectors of neighboring blocks, but also of the same block like the current block, but in previously encoded/decoded pictures. In other words, the prediction for the proper subset may also reference parameters in other pictures, for example, a temporal prediction from the block (from the predetermined region) at the same location in previously encoded/decoded images. This prediction may also be the result of a temporal direct mode prediction. In general, the prediction of the proper subset of the motion parameter vector components (the prediction 114 of the first subset 212) references a previously decoded signal. At the decoder side (for example at the decoder 100 according to FIG. 1), the motion parameter vector components (the first subset 212) of the selected proper subset for the current motion parameter vector are reconstructed using the prediction (the prediction 114 for the first subset 212) and the transmitted differences (the residual information 116 for the first subset 212) to obtain a reconstruction of the motion parameter vector components of the selected proper subset (the reconstruction 118 of the first subset 212).

In a second step 420 of the method 400, another proper subset (for example the second subset 214) of the motion parameter vector components (which does not contain any element of the subset selected in the first step, or in other words, which is disjoint to the first subset 212) is predicted using the corresponding motion parameter vector components of one or more motion parameter vectors of neighboring blocks or picture regions and the already transmitted or coded motion parameter vector components (which are obtained in the decoder as the reconstruction 118 of the first subset 212) for the current motion parameter vector. According to some embodiments, this prediction for the other proper subset (the prediction 122 for the second subset 214) may also reference parameters in other pictures, e.g., a temporal prediction from the block (from the predetermined region) at the same location in previously coded images. This prediction may also be the result of temporal direct mode prediction. In general, the prediction of the other proper subset (of the second subset 214) of the motion parameter vector components references the same previously decoded signal, as the prediction of the previously coded proper subset.

As explained before, in the numerical examples, according to some embodiments, the already transmitted motion parameter vector components (the reconstruction 118 of the first subset 212) are used for reducing the set of candidate motion parameter vectors (which are previously coded motion parameter vectors of blocks neighboring the current block or previously coded motion parameter vectors of the current block in previously coded pictures). The reduced set of candidate motion parameter vectors can then be used for determining a prediction (e.g. the prediction 122 for the second subset 214) and a residual information (e.g. the residual information 124 for the second subset 214) for the remaining motion parameter components of the motion parameter vector. A measure for the differences between the already transmitted motion parameter vector components (the reconstruction 118 of the first subset 212 or in the encoder the first subset 212) and the corresponding motion parameter vector components for the motion parameter vector candidates (which is a set of motion parameter vectors of neighboring blocks or picture regions or of motion parameter vectors of the same block of previous pictures) is analyzed and one or more of the candidate motion parameter vectors are selected based on the difference measure, for determining the prediction for the remaining motion parameter vector components of the current motion parameter vector.

In other words, at the encoder side the first subset 212 of the plurality of motion parameters, defining the motion-compensated prediction of the predetermined region of the picture is compared with a first subset of candidate motion parameter vectors defining the motion-compensated prediction of a region neighboring the predetermined region or of the same region in a previously encoded picture. Based on the differences between the first subset 212 of the plurality of motion parameters defining the motion-compensated prediction of the predetermined region and the first subsets of the candidate motion vectors, the number of the candidate motion vectors is reduced.

At the decoder side (for example at the decoder 100 according to FIG. 1) the set of candidate motion parameter vectors is reduced based on the reconstruction 118 of the first subset 212.

According to some embodiments, only the motion parameter vector(s) for which the different measure is minimized is/are selected as candidate motion parameter vector(s) for predicting the remaining motion parameter vector components of the motion parameter vector. According to further embodiments, the motion parameter vector(s) for which the different measure is minimized and the motion parameter vector(s) for which the difference measure is smaller than a particular threshold (which can be derived based on the minimum difference measure) are selected.

Then, the prediction of the other subset of motion parameter vector components (the prediction for the second subset 214) is done using the corresponding motion parameter vector components (for example second subsets) of the selected motion parameter vector candidate or candidates (of the reduced set of the motion parameter candidates, i.e. the candidates that are selected based on the difference measure). This may happen in the encoder and also in the decoder.

The differences between the actual values of the motion parameter vector components and the prediction values (the residual information 116 of the first subset 212 and the residual information 124 for the second subset 214) are transmitted (from the encoder to the decoder).

According to further embodiments, the prediction and encoding of the motion parameter vector components may consist of further steps that are similar to the second step 420 of the method 400. If not all motion parameter vector components (not all motion parameters of the plurality of motion parameters defining the motion-compensated prediction of the predetermined region of the picture) have been coded in the first and second step, further subsets of motion parameter vector components may be predicted based on the corresponding motion parameter vector components of a set of motion parameter vectors of neighboring blocks or picture regions or of the same block in previous pictures and the already coded motion parameter vector components of the current motion parameter vector.

According to some embodiments each subset for which the prediction encoding is interleaved consists exactly of one motion parameter vector component (for example may the first subset 212 refer to a horizontal direction of the motion parameters, and the second subset 214 refer to a vertical direction of the motion parameters).

According to further embodiments one or more subsets may consist of two or more motion parameter vector components.

According to some embodiments, the interleaved prediction and encoding of motion parameter vector components (of subsets of parameters of a plurality of motion parameters, defining the motion-compensated prediction of a predetermined region of a picture) can be extended to reference picture indices that are associated with the motion parameter vectors. The reference picture indices may be coded in advance and their values may be employed for predicting the motion parameter vector components or the motion parameter vector components may be used for predicting the reference picture indices.

As mentioned before, according to some embodiments, image regions (regions of a picture of a video) that are associated with motion parameter vectors (defining the motion-compensated prediction for the image regions) are quadratic or rectangular blocks and the motion parameter vectors may represent displacement vectors (which may also be simply referred to as motion vectors), which comprise a horizontal and a vertical component. The prediction encoding of a particular displacement vector for a current block (for a predetermined region) may be done according to a method 500, which is shown in a flow diagram in FIG. 5.

Figure 5:
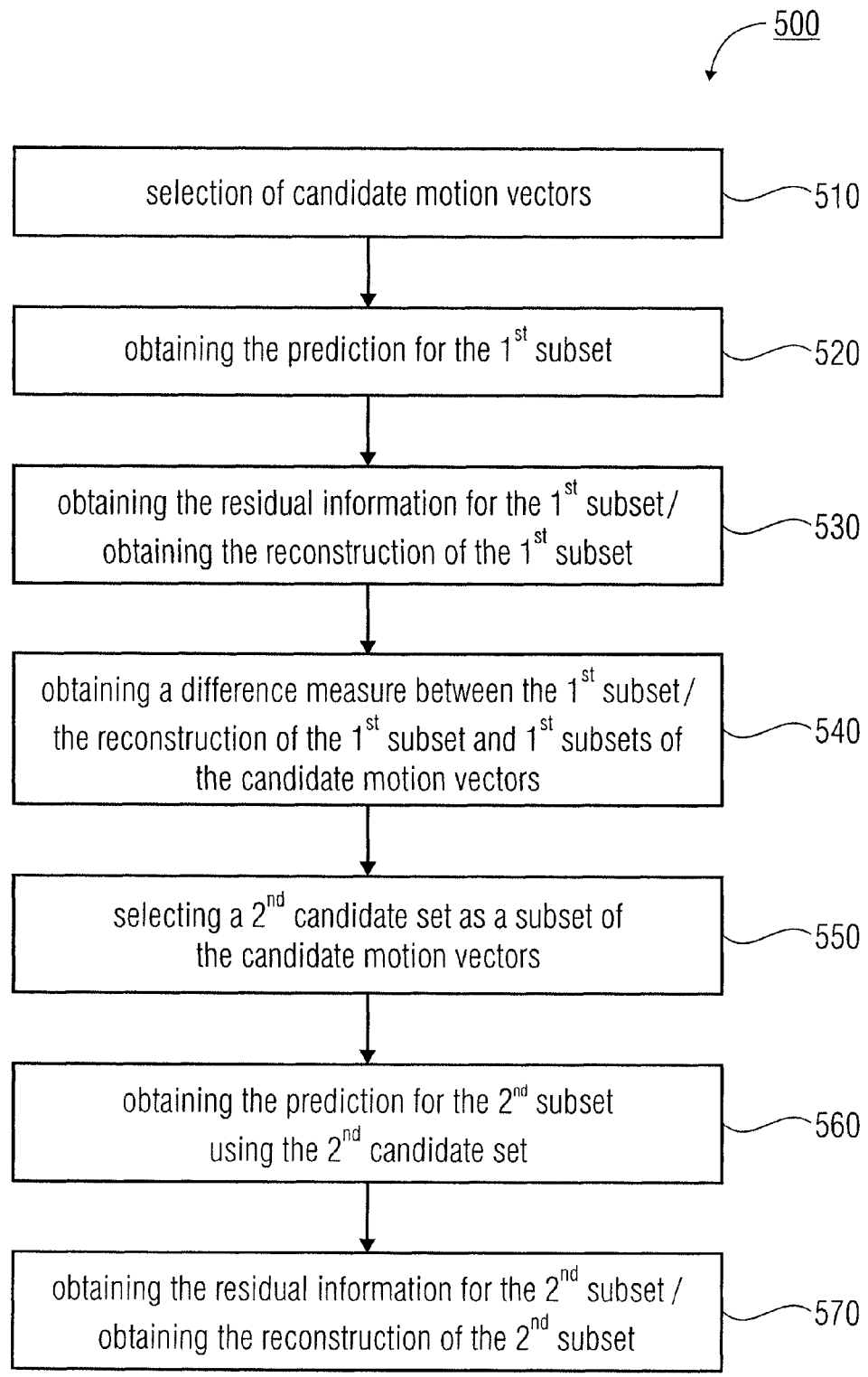
FIG. 5 shows a flow diagram of a method according to an embodiment according to the first aspect of the present invention.

FIG. 5 shows, therefore, a method 500 according to an embodiment of the present invention for prediction and encoding/decoding a plurality of motion parameters defining the motion-compensated prediction of a predetermined region of a picture of a video. The method 500 basically comprises the following steps. In a step 510 a set of candidate motion vectors for a prediction of a first motion vector component (the first subset 212) of the displacement vector for the current block is selected. In a further step 520 the first motion vector component is predicted using first motion vector components (first subsets) of the candidate motion vectors. In a further step 530 a difference (the residual information 116 for the first subset 212) between the first motion vector component (the first subset 212) and its prediction (the prediction 114 for the first subset 212) is coded (in the encoder). At the decoder side, the first motion vector component is reconstructed based on the prediction and the transmitted difference (the residual information 116 for the first subset 212). In a further step 540 a difference measure between the first motion vector component of the current motion vector (of the displacement vector for the current block) and the first motion vector component of a motion vector candidate is calculated for all motion vector candidates. In a further step 550 a usually reduced set of candidate motion vectors is selected based on the calculated difference measures. In a further step 560 a second motion vector component (the second subset 214) of the displacement vector for the current block is predicted using second motion vector components of the reduced set of candidate motion vectors. In a further step 570 a difference (the residual information 124 for the second subset 214) between the second motion vector component (the second subset 214) and its prediction (the prediction 122 for the second subset 214) is coded (in the encoder). At the decoder side, the second motion vector component is reconstructed based on the prediction and the transmitted difference (the residual information 124 for the second subset 214).

As mentioned before, according to some embodiments the first motion vector component (the first subset 212) may be a vertical component and the second motion vector component (the second subset 214) may be a horizontal component. In further embodiments of the present invention the first motion vector component may be the horizontal component and the second motion vector component may be the vertical component.

In the following the method 500 according to FIG. 5 is explained in more detail using the FIG. 3 and FIG. 6, which show drawings, of already coded neighboring blocks of the current block from which the candidate motion vectors are selected.

In step 510 of the method 500 an initial set of candidate motion vectors is selected. The step 510 can be basically separated into the selection of neighboring blocks and the selection of motion vectors for these blocks. According to some embodiments of the present invention, the selected set of neighboring blocks may be the same as in the H.264 standard as it has been described before according to FIG. 3, that means three candidate blocks are selected. The block A that contains the left neighbor sample of a top left sample of the current block X (for which the motion parameter vector has to be predicted) is selected as a first candidate block. The block B that contains the top neighbor sample of the top left sample of the current block X is selected as a second candidate. The block C that contains the top right neighbor sample of a top right sample of the current block X is chosen as a third candidate. If the block C is not available, e.g. because it lies outside the current slice of the current picture or it has not been coded before the current block (before the predetermined region) the third candidate is replaced by the motion vector of a block D that contains the top left neighbor sample of the top left sample of the current block X.

According to further embodiments of the present invention, all blocks that contain a sample (a pixel) that represents a direct neighbor of any sample (any pixel) inside the current block X and have already been coded (i.e., precede the current block X in encoding or decoding order) are selected as candidate blocks. FIG. 6 shows an example of already coded neighboring blocks of the current block X. The candidate set of motion vectors for predicting the motion vector of the current block X would therefore contain the motion vectors from the blocks A, B, C, D, E, F, G, H, I.

After the selection of the neighboring blocks, the set of motion vector candidates is selected among the motion vectors that are associated with the selected neighboring blocks. It should be noted that motion vectors can be associated with different reference pictures and that one block can also be associated with no motion vector (for example, if it is intra-coded) or with more than one motion vector (for example, different motion vectors for different reference pictures). According to some embodiments, all motion vectors that are associated with the same reference picture (or same reference picture index) as the current motion vector (which has to be predicted) are selected as candidate motion vectors. According to further embodiments of the present invention, all motion vectors that are associated with the same reference picture (or same reference picture index) and the same reference list as the current motion vector are selected as candidate motion vectors. A reference index or reference list of the motion vector for the current block X may be transmitted or signaled in the data stream from the encoder to the decoder. If none of the motion vectors of the candidate set fulfills the above-mentioned conditions, other motion vectors may be selected. According to further embodiments, a specific set of motion vectors is selected for particular block sizes and/or block shapes and/or block locations. If there does not exist a neighboring block (for example because the current block X is the first block in a slice) or none of the neighboring blocks is associated with a motion vector, the motion vector selection process does not select any motion vector, the candidate motion vector set maybe set to a single motion vector for which both components of the single motion vector are equal to zero. A residual signal for the motion vector may then be the motion vector itself.

In step 520 the first motion vector component (the first subset 212) is predicted using first motion vector components of the selected candidate motion vectors. In other words, in step 520 the prediction 114 for the first subset 212 is obtained. According to some embodiments of the present invention, the prediction of the first motion vector component is given by the median of the first motion vector components of the candidate motion vectors. Therefore, the first motion vector components of the candidate motion vectors are ordered in an increasing (or decreasing) order. According to some embodiments of the present invention, multiple entries of the same values are allowed in the resulting ordered vector and according to some further embodiments of the present invention, multiple entries of the same value are removed before ordering. If the resulting ordered vector consists of an odd number of values, the middle element of the ordered vector is selected as median prediction value. If the resulting ordered vector consists of an even number of values, one of the two center elements (the smaller or the larger one) of the ordered vector is selected as the median prediction value, or an average of the two center elements is selected as prediction value. If the ordered vector consists of two elements, the (potentially rounded) average of these two values may be taken as prediction value.

In step 530, the difference between the first motion vector component and its prediction is coded. In other words, the residual information 116 for the first subset 212 is determined and coded in the encoder. According to some embodiments of the present invention, the difference is coded using a variable length code. According to further embodiments of the present invention, the difference is coded using adaptive arithmetic coding or another entropy coding method based on probability modeling. At the decoder side, the transmitted difference is decoded and the first motion vector component is reconstructed based on the prediction and the transmitted difference. In other words, at the decoder side the reconstruction 118 of the first subset 212 is obtained based on the prediction 114 for the first subset 212 and the transmitted residual information 116 for the first subset 212.

In step 540, a difference measure between the first motion vector component of the current motion vector and the first motion vector component of a motion vector candidate is calculated for all motion vector candidates. In other words, in the encoder the difference between the first subset 212 of the motion vector of the current block X and the first subset of the candidate motion vectors is calculated for each candidate motion vector. In the decoder the difference between the reconstruction 118 of the first subset 212 and the reconstructions of the first subsets of the candidate motion vectors are calculated for each candidate motion vectors. According to some embodiments of the present invention, a difference measure is the absolute value of the difference between the first motion vector component (the first subset 212 or the reconstruction 118 of the first subset 212) of the current motion vector and the first motion vector component (the first subset or the reconstruction of the first subset) of a motion vector candidate. According to some embodiments, the set of candidate motion vectors (for which the difference measures are calculated) can be different from the set of candidate motion vectors that is used in step 520.

In step 550, the set of candidate motion vectors (for which the difference measures are calculated in step 540) is reduced based on the calculated difference measures. According to some embodiments of the present invention, only the motion vector candidates are kept for which the difference measure is equal to the minimum of the difference measure for all candidate motion vectors. According to further embodiments of the present invention, a threshold for the difference measure is calculated based on the minimum of the difference measure for all motion vector candidates and the motion vector candidates are kept, for which the difference measure is less than (or less than equal to) the calculated threshold. In other words, according to some embodiments a second candidate set is selected as a subset of the candidate set of motion vectors, which has to be selected in step 510. According to further embodiments, the candidate set is selected as a subset of the candidate set of motion vectors for which the difference measures are calculated in step 540 (which may be different from the set used in step 510). The selection is, in the encoder, based on the first subset 212 and, in the decoder, based on the reconstruction 118 of the first subset 212. According to some embodiments, as it has been described before, the selection may be based on the difference measure between the first subset 212 or the reconstruction 118 of the first subset 212 and the first subsets of each of the motion vectors of the initial candidate set (which may be the same candidate set as used in step 510).

In step 560, the second motion vector component is predicted using the second motion vector component of the reduced set of candidate motion vectors. In other words, in step 560 the prediction 122 for the second subset 214 is obtained by using second subsets of the motion vectors of the second candidate set of motion vectors. According to some embodiments of the present invention, the prediction of the second motion vector component or the second subset 214 is obtained in the same way as for the first motion vector component or the first subset 212, with the only difference being that a reduced set of motion vector candidates (the second candidate set) is used and the prediction is calculated using the second motion vector component (the second subset) of the reduced set of motion vector candidates. According to further embodiments of the present invention, a different algorithm as for the first motion vector component is used. As an example, the prediction for the second motion vector component (the prediction 122 for the second subset 214) could be set equal to the arithmetic mean of the second motion vector components (of the second subsets) of the reduced set of motion vector candidates (of the second candidate set).

In step 570, the difference between the second motion vector component and its prediction is determined and is coded in the encoder. In other words, the residual information 124 for the second subset 214 is determined based on the second subset 214 and the prediction 122 for the second subset 214 and the residual information 124 for the second subset 214 is encoded. According to some embodiments of the present invention, the difference (the residual information 124 for the second subset 214) is coded using a variable length code. According to further embodiments of the present invention, the difference (the residual information 124 for the second subset 214) is coded using adaptive arithmetic coding or another entropy coding method based on probability modeling. At the decoder side, the second motion vector component is reconstructed based on the prediction and the transmitted difference. In other words, at the decoder side the reconstruction 126 of the second subset 214 is obtained by using the prediction 122 for the second subset 214 and the residual information 124 for the second subset 214 transmitted in the data stream 112.

In a decoder according to an embodiment of the present invention (for example in the decoder 100 according to FIG. 1) the steps 510, 520, 540, 550 and 560 may be performed in a predictor (for example, predictor 110) of the decoder or in other words, a predictor of the decoder may be configured to perform these steps. The steps 530 and 570 of the method 500 may be performed in a reconstructor (for example, reconstructor 120) of the decoder or in other words, a reconstructor of the decoder may be configured to perform these steps.

In an encoder according to an embodiment of the present invention (for example the encoder 200 according to FIG. 2) the steps 510, 520, 540, 550 and 560 may be performed in a predictor (for example, the predictor 210) of the encoder or, in other words, a predictor of the encoder may be configured to perform these steps. The steps 530 and 570 of the method 500 may be performed in a residual determiner (for example, the residual determiner 220) of the encoder or, in other words, a residual information determiner of the encoder may be configured to perform these steps.

In the above described embodiments, a motion vector was described as a translational motion vector with two components, wherein one component determined a horizontal direction and a second component determined a vertical direction. According to further embodiments of the present invention, one or more of the motion parameter vectors represent parameter vectors for higher-order motion models, which contain more than two components. In these, regions that are associated with these motion parameter vectors may be all quadratic or rectangular blocks.

According to some embodiments of the present invention, the higher-order motion parameter vectors also contain a translational part that specifies a horizontal and vertical displacement of a particular location (like the above-described motion parameter vectors). The higher-order parameter vectors may further contain components which describe further parameters, like a rotation parameter or a compression parameter or a relaxation parameter. The higher-order motion parameter vectors may, for example, be based on the affine motion model with six parameters, which correspond to six components of the higher-order motion parameter vectors.

According to some embodiments of the present invention, all blocks in the picture use the same higher-order motion model and according to further embodiments of the present invention, different blocks of a picture can use different motion models, wherein the set of possible motion models includes the simple translation model with two components. According to some embodiments of the present invention, the translational part of the motion parameter vector may be predicted and coded in the same way as in the embodiment with block-based coding and translational motion vectors described above with FIGS. 5 and 6.

According to some embodiments of the present invention, the higher-order components (if available) of a higher-order motion parameter vector are predicted and coded in one step, that means, for predicting the higher-order components, the original set of motion parameter vectors (that was generated for predicting the first translational component or the first subset 212 in step 510 of the method 500 or that was used for calculating the difference measures in step 540 of the method 500) is again reduced by analyzing the difference measure between the translational part of the current motion parameter vector and the translational part of the candidate motion parameter vector. The reduced candidate set for predicting the higher-order components does not need to be a subset of the reduced candidate set (the second candidate set determined in step 550 of the method 500) that was used for predicting the second translational component (the second subset 214) in step 560 of the method 500. As difference measure for the reduction of the candidate set, the absolute value of the difference vector between the actual translational part of the current motion parameter vector and the translational part of the candidate motion parameter vector can be used. Based on the difference measure, the candidate set for predicting the higher-order motion components is reduced. According to some embodiments of the present invention, the reduced candidate set is obtained as described above for the embodiment with block-based coding and translational motion vectors according to FIGS. 5 and 6, just with a different difference measure. Higher-order components that are not available for candidate motion parameter vectors are inferred to be equal to a particular value (for example zero). According to further embodiments of the present invention, the described selection of the candidate set is only done among motion parameter vector candidates that include the higher-order components (or a subset of them). A number of higher order components of the current higher-order motion parameter vector may be signaled or predicted in the data stream 112. Given the reduced set of candidate motion parameter vectors, all higher-order components of the current higher-order motion parameter vectors are predicted (either using median prediction, or using the average of the corresponding components for the candidate motion parameter vectors, or using a different prediction algorithm) and the corresponding differences (residual information) between the actual values of the higher-order components and their predictions are coded and transmitted in the data stream.

According to some embodiments of the present invention, the higher-order components (if available) are predicted and coded in subsets, wherein each subset may contain one or more of the higher-order components. For predicting each subset of higher-order components, the original candidate set of motion parameter vectors (that was generated for predicting the first translational component in step 510 of the method 500 or that was used for calculating the difference measures in step 540 of the method 500) is reduced by analyzing a difference measure between the already transmitted or coded components (including the translational part, for example the first subset 212) of the current motion parameter vector and the corresponding components (first subsets) of the candidate motion parameter vectors (which have been coded previously before the current motion parameter vector). Higher-order components that are not available for candidate motion parameter vectors are inferred to be equal to a particular value (e.g., zero). As difference measure, the absolute value of the difference vector between the vector of actual values for the already transmitted or the already coded components of the current motion parameter vector and the vector of values for the corresponding components of the candidate motion parameter vectors can be used. Based on the difference measure, the candidate set is reduced.

Figure 6:
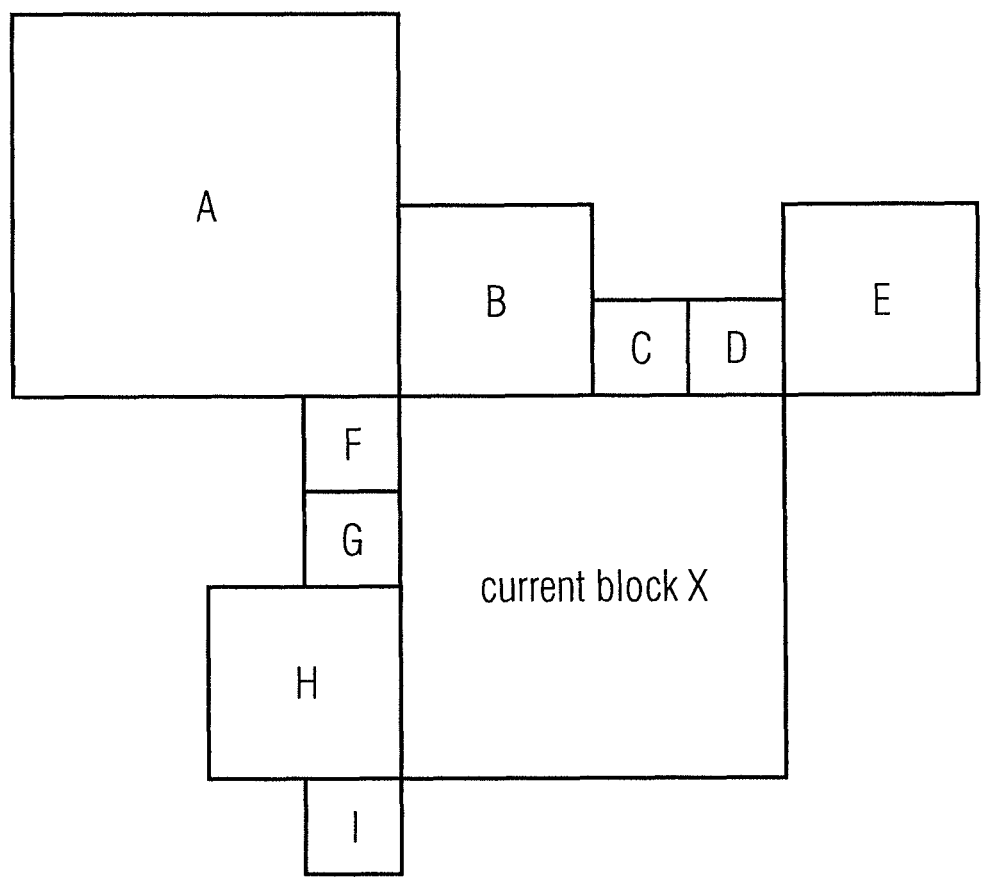
FIG. 6 shows an example for the selection of already coded neighboring blocks for motion-compensated prediction.

According to some embodiments of the present invention, the reduced candidate set is obtained as described above for the embodiment with block-based coding and translational motion vectors according to FIGS. 5 and 6, just with a different difference measure. Higher-order components that are not available for candidate motion parameter vectors are inferred to be equal as a particular value (e.g. zero). According to some embodiments, the described selection of the candidate set of motion vectors is only done among motion parameter vector candidates that include the currently considered higher-order component or the currently considered subset. Given the reduced set of candidate motion parameter vectors, the current higher-order component or the subset is predicted (either using median prediction, or using the average of the corresponding components or subsets for the candidate motion parameter vectors, or using a different prediction algorithm) and the corresponding difference between the actual value of the current higher-order component or subset and its prediction is coded.

Figure 7:
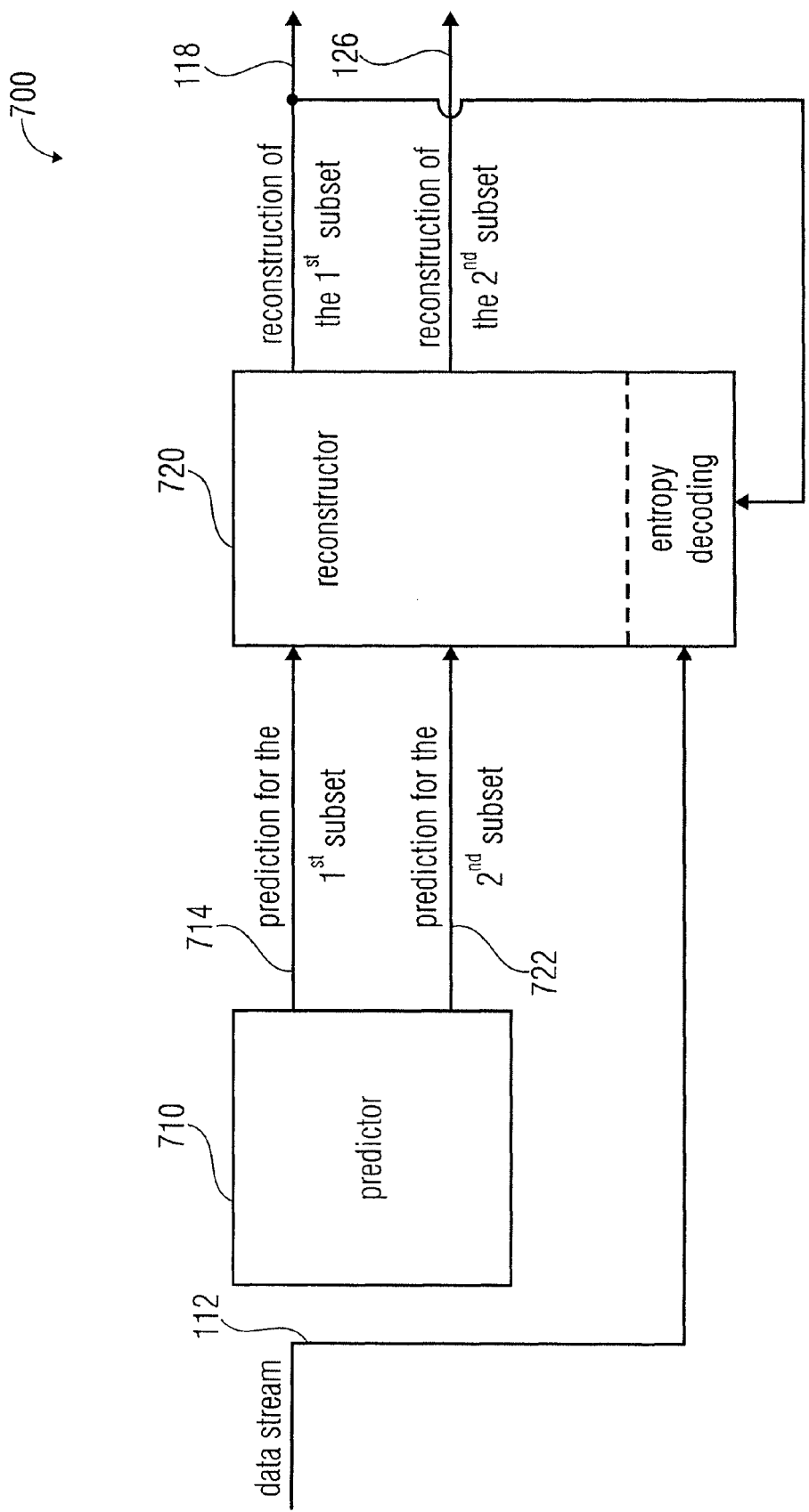
FIG. 7 shows a block diagram of a video decoder according to an embodiment according to the second aspect of the present invention.

FIG. 7 shows a block-diagram of a video decoder 700 according to an embodiment according to the second aspect of the present invention. The video decoder 700 using motion-compensated prediction comprises a predictor 710 and a reconstructor 720. The predictor 710 is configured to predict a first subset of parameters and a second subset of parameters of a plurality of motion parameters defining the motion-compensated prediction of a predetermined region of a picture of a video to obtain a prediction 714 for the first subset and a prediction 722 for the second subset. The first subset is disjoint from the second subset. The reconstructor 720 is configured to reconstruct the first subset of parameters from the prediction 714 for the first subset and from first residual information for the first subset contained in a data stream 112 to obtain a reconstruction 118 of the first subset. The reconstructor 720 is further configured to reconstruct the second subset of parameters from the prediction 722 for the second subset and from second residual information for the second subset contained in the data stream 112 to obtain a reconstruction 126 of the second subset. The reconstructor 720 is further configured to obtain the first and second residual information from the data stream 112 using entropy decoding using a probability estimation. The reconstructor 720 is further configured to adapt the probability estimation for entropy decoding the second residual information by using the reconstruction 118 of the first subset.

By the adaptation of the probability estimation for entropy decoding the second residual information from the data stream 112, the second residual information may be differently entropy-decoded than the first residual information, based on the first subset or the reconstruction 118 of the first subset. For example, for entropy decoding of the first residual information for the first subset another context may be chosen than for entropy decoding of the second residual information for the second subset. Of course, the context chosen for entropy decoding the first residual information for the first subset and the context chosen for entropy decoding the second residual information for the second subset has to be the same in an encoder as in the decoder. The decoder adapts the probability estimation based on the reconstruction 118 of the first subset and an encoder may adapt the probability estimation based on the first subset or based on a reconstruction of the first subset determined in the encoder.

By adapting the probability estimation for entropy decoding the second residual information for the second subset based on the reconstruction 118 of the first subset a context for the second residual information can be chosen, which minimizes the size of the residual information in the data stream 112 and therefore optimizes the coding efficiency relative to standard techniques.

As an example, if the first subset represents a reference picture index and the second subset a translational motion component, which refers to this reference picture index, the reconstructor 720 may adapt the probability estimation for entropy decoding the second residual information (the translational motion information) by using a reconstruction 118 of the reference picture index. The reconstructor 720 may choose a first context for entropy decoding the second residual information for the second subset if the reference index is 0, which means the translational motion information determined by the second subset refers to a previously encoded picture. The reconstructor 720 may choose a second context if the reference index is 1 (or if the reconstruction 118 of the reference index is 1), which means the translational motion information determined by the second subset refers to a picture which has been decoded before the previous picture, which has been decoded before the current picture. It can be assumed that the translational motion information referring to the picture index 0 is typically smaller than the translational motion information referring to the picture index 1. The first context may therefore be chosen that small numbers may be coded with the less number of bits than in the second context, wherein higher numbers are coded with fewer bits than in the first context. Therefore the translational motion information may be represented with fewer bits, than in systems, wherein a coding of components of a motion parameter vector is independent of the components of the motion parameter vector, or in systems in where the same probability estimation is used for every component of the motion parameter vector. Or in other words, the residual information for the second subset may be represented with fewer bits in the data stream, than it is known from commonly known video coding systems.

In other words, the first subset may determine a reference picture index and the reconstructor 720 may be configured to adapt the probability estimation for entropy decoding the second residual information for the second subset by using a reconstruction of the reference picture index.

As mentioned before, a probability estimation or context chosen for entropy decoding the first or second residual information has to be the same like a context or probability estimation chosen for entropy encoding the first or second residual information. Therefore, a video encoder which employs an entropy encoding suitable for the video decoder 700 according to FIG. 7, is shown in FIG. 8.

Figure 8:
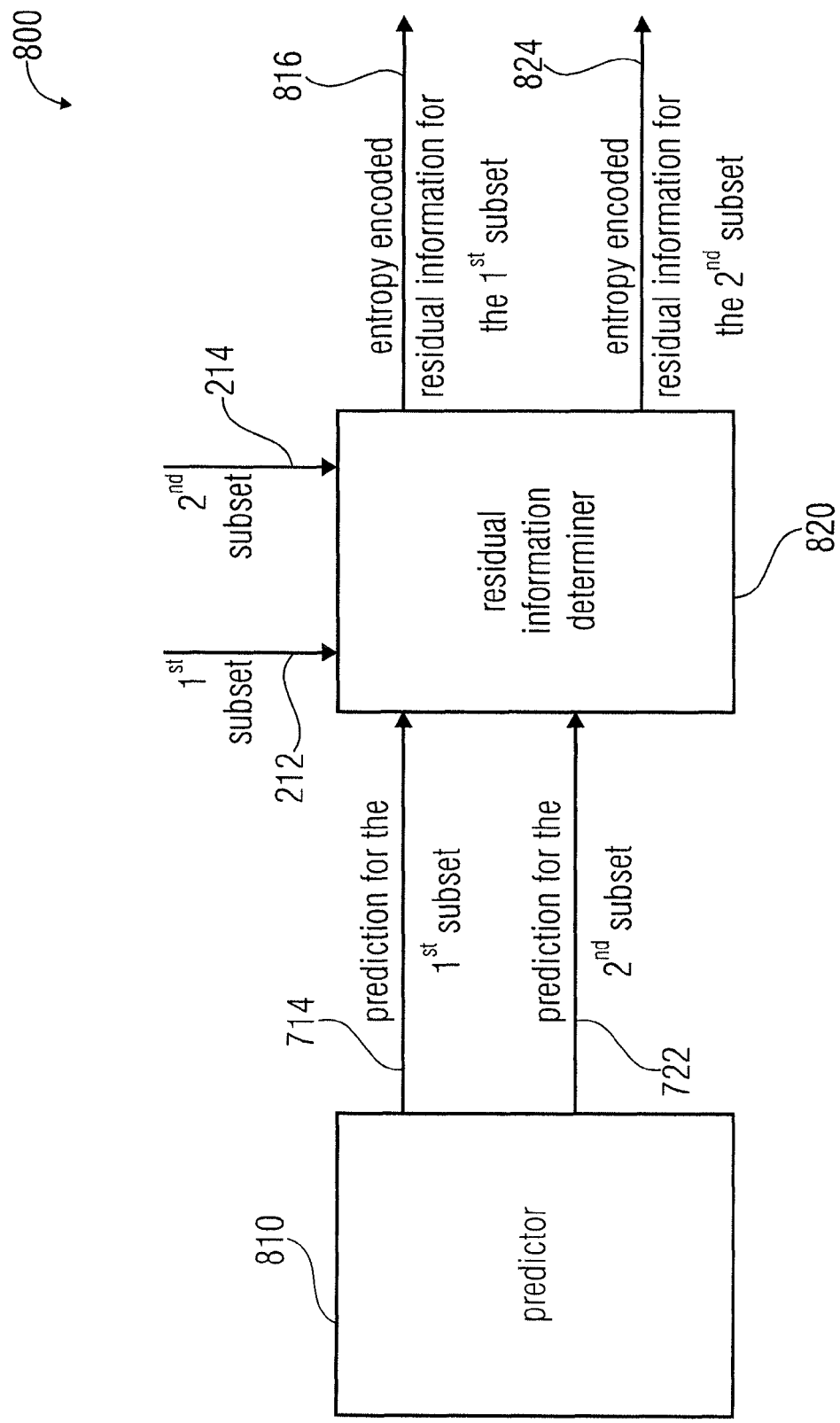
FIG. 8 shows a block diagram of a video encoder according to an embodiment according to the second aspect of the present invention.

FIG. 8 shows a block diagram of a video encoder 800 according to an embodiment according to the second aspect of the present invention. The video encoder 800 comprises a predictor 810 and a residual information determiner 820. The predictor 810 is configured to predict a first subset 212 and a second subset 214 of parameters of a plurality of motion parameters determining a motion-compensated prediction of a predetermined region of a picture, to obtain a prediction 714 for the first subset 212 and a prediction 722 for the second subset 214. The first subset 212 is disjoint from the second subset 214. The residual information determiner 820 is configured to determine a first entropy coded residual information 816 for the first subset 212 and a second entropy encoded residual information 824 for the second subset 214 by using a probability estimation. The residual information determiner 820 is further configured to adapt the probability estimation for entropy encoding the second residual information for the second subset 214 using the first subset 212. In other words, the residual information determiner 820 is configured to choose a context for entropy encoding the residual information for the second subset 214, based on the first subset 212. A context or a probability estimation for entropy encoding the residual information for the first subset 212 may therefore be different from a context or probability estimation for entropy encoding the residual information for the second subset 214. The entropy encoded residual information 816 for the first subset 212 and the entropy encoded residual information 824 for the second subset 214 may be inserted into a data stream 112 and may be entropy decoded by a reconstructor (for example the reconstructor 720) of a decoder (for example the decoder 700). A context or a probability estimation chosen for entropy encoding the residual information for the first subset 212 may be the same as it would be used in the known H.264 standard, but a context or probability estimation chosen for entropy encoding the residual information for the second subset 214 may be different for every region of the picture or, in other words, different for every motion parameter vector of different regions of a picture, and may therefore differ from a context chosen using the known H.264 standard. Because of the fact, that the context or the probability estimation chosen for entropy encoding the residual information for the second subset 214 is based on the first subset 212 in the encoder 800, a decoder can determine the context or the probability estimation chosen for entropy decoding the residual information for the second subset 214 based on the reconstruction 118 of the first subset 212. Therefore, the context or probability estimation which has been used for entropy encoding the residual information for the second subset 214 does not need to be inserted into the data stream 112 or be signaled within in the data stream 112. Therefore, no additional overhead in the data stream 112 is generated.

Figure 9:
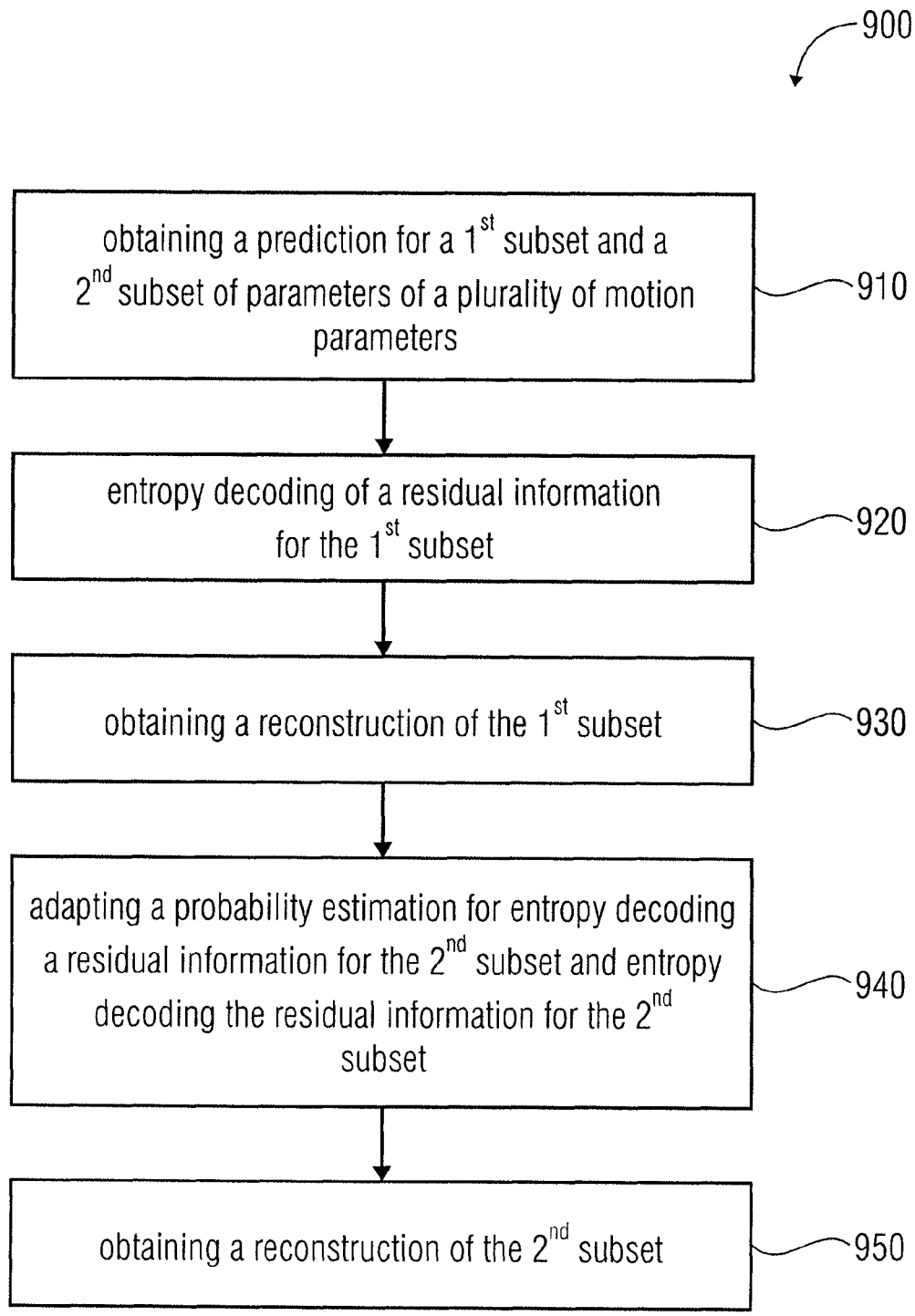
FIG. 9 shows a block diagram of a method according to an embodiment according to the second aspect of the present invention.

FIG. 9 shows a flow diagram of a method 900 for obtaining a reconstruction of a plurality of motion parameters defining a motion-compensated prediction of a predetermined region of a picture of a video. The method 900 may, for example, be performed on the decoder 700 according to FIG. 7.

In a step 910 of the method 900, the prediction 714 for the first subset 212 and the prediction 722 for the second subset 214 are obtained (in the predictor 710). The prediction 714 for the first subset 212 and the prediction 722 for the second subset 214 may be obtained as in the H.264 standard, as it has been described according to FIG. 3 by using previously reconstructed motion information of neighboring regions or blocks or of the same region or block in previously reconstructed pictures. In an encoder, the prediction 714 for the first subset 212 and the prediction 722 for the second subset 214 may be obtained by using previously encoded motion information of neighboring regions or blocks or of the same region or block in previously encoded pictures.

In a further step 920 of the method 900, the residual information for the first subset 212 is entropy decoded in the predictor 710 by using a predetermined probability estimation or context. In the encoder, the residual information for the first subset 212 would be determined and entropy encoded by the residual information determiner 820 using the predetermined probability estimation or context.

In a further step 930 of the method 900, the reconstruction 118 of the first subset 212 is obtained in the reconstructor 720 from the prediction 714 for the first subset 212 and the entropy decoded residual information for the first subset 212. The encoder does not need to perform this step.

In a further step 940 of the method 900, the reconstructor 720 adapts a probability estimation or a context for entropy decoding the residual information for the second subset 214 based on the reconstruction 118 of the first subset 212 and further entropy decodes the residual information for the second subset 212. The encoder adapts the probability estimation or the context for entropy encoding the residual information for the second subset 214 based on the first subset 212 and entropy encodes the residual information for the second subset 214 using the adapted probability estimation. The encoder may perform this step together with a step of entropy encoding the residual information for the first subset 212.

In a further step 950, the reconstructor 720 obtains the reconstruction 126 of the second subset 214 by using the prediction 722 for the second subset 214 and the entropy decoded residual information for the second subset 214. The encoder does not need to perform this step.

According to further embodiments, the predictor 710 of the decoder 700 may be configured to obtain the prediction 722 for the second subset 214 by using the reconstruction 118 of the first subset 212, as it has been described with the decoder 100 according to FIG. 1.

According to further embodiments, the predictor 810 of the encoder 800 may further be configured to obtain the prediction 822 for the second subset 214 by using the first subset 212, as it has been described with the encoder 200 according to FIG. 2.

The reconstructor 120 of the decoder 100 may therefore be also configured to obtain the residual information 116 for the first subset 212 and the residual information 124 for the second subset 214 from the data stream 112, by using entropy decoding using a probability estimation, and to adapt the probability estimation for entropy decoding the second residual information 124 for the second subset 214, using the reconstruction 118 of the first subset 212.

In other words, the already transmitted information (the reconstruction 118 of the first subset) of the motion parameter component can also be employed in the entropy coding for the remaining motion parameter vector components (the second subset 214). According to some embodiments of the present invention, the entropy coding includes the probability modeling. The syntax elements for transmitting each motion parameter vector components are mapped into a sequence of binary symbols (bins). Each bin is associated with a context that specifies the employed probability model. According to some embodiments of the present invention, the already coded motion parameter vector components (the reconstruction 118 of the first subset) are used for selecting a context for the bins of the remaining (dependently coded) motion parameter vector components (the second subset 214). As mentioned before, the motion parameter vectors may be displacement vectors with the first component for a horizontal direction and a second component for a vertical direction. The first component may be predicted encoded similar to the standard technology coding techniques (e.g. as in the H.264 standard). The second component may be predicted as described with FIGS. 4 and 5. For coding the difference (the residual information 116 for the second subset 214) between the actual value of the second motion vector component (the second subset 214) and its prediction (the prediction 122 for the second subset 214), a context is selected for each transmitted bin. The context for one or more of the bins is selected based on the already transmitted first motion vector component (the reconstruction 118 of the first subset 212). As an example, the difference between the actual value of the first motion vector component and the first motion vector component of the candidate vectors is calculated (as described above) and the context is selected based on the difference values for the candidate set. As a particular example, a first context may be selected if all absolute values of the difference are less than a predefined threshold (or if the absolute values of the differences between the difference values are less than a predefined threshold), and otherwise a second context is selected. This concept can be extended to more than two contexts; and it can also be extended to motion parameter vectors with more than two components (more than two subsets). Furthermore, reference picture indices that are associated with a motion parameter vector can be additionally included in the context derivation, i.e., the reference picture indices can be used for deriving the context for the motion parameter vector components or the motion parameter vector components can be used for deriving the context of the reference picture indices.

According to further embodiments of the present invention, blocks or regions may have multiple motion parameter vectors (and reference picture indices). These blocks are predicted with multiple hypotheses (e.g., so-called bi-predicted blocks). This multiple motion parameter vectors as well as the information how many hypothesis are used for a block are coded in a dependent way. Assuming displacement vectors (consisting of two components) the following could be applied for blocks with multiple hypotheses. First, the first motion vector component is predicted as described above with the FIGS. 4 and 5 and the corresponding difference signal (the residual information signal) is coded in the encoder and the reconstruction of the first motion vector component is obtained in the decoder. In a second step the difference measures for the first motion vector components are calculated as described above according to FIGS. 4 and 5 and it is checked whether one or more of the blocks that are associated with the minimum difference measure employ multiple hypothesis prediction (and how many hypotheses are used for this block or these blocks). Based on this information a context or a probability estimation is selected for coding the information of how many hypothesis are used for the current block. Third, if the transmitted information signals that a single hypothesis is used, the second motion vector component (the second subset) is coded as described above with the FIGS. 4 and 5. Otherwise, the second motion vector component and the motion vector components of the other hypothesis are predicted and coded similarly (by interleaving the prediction and coding of subsets of motion vector components).

This described embodiment for multi-hypothesis prediction can be extended to higher-order motion parameter vectors in the straightforward way. Furthermore, it can be extended to include the associated reference indices in the interleave prediction encoding process, as described before. Furthermore, the order of components/parameters that is used for prediction can be modified in several ways. The contexts that are used for coding the components/parameters can be modeled based on already transmitted components/parameters in various ways.

According to further embodiments of the present invention, the described motion parameter vector prediction and encoding may be combined with the transmission of one or more syntax elements that specify whether a motion parameter vector is completely inferred or whether it is coded. If the one or more syntax element signals that the motion parameter vector is inferred, no further syntax elements are transmitted for coding the motion parameter vector. According to some embodiments of the present invention, the motion parameter vector is set equal to one of the motion parameter vectors of the neighboring block. Which of the neighboring block is selected may be additionally specified by the one or more syntax elements. According to a further embodiment of the present invention, the motion parameter vector is inferred to be equal to a prediction that is derived based on the motion parameter vectors of the neighboring blocks. As an example, the prediction vector can be obtained by median prediction.

According to further embodiments of the present invention, the described concept of the motion parameter prediction can be combined with the method for merging of blocks (of neighboring blocks). Therefore, the coding parameters for a block can include one or more syntax elements that specify whether the block is merged with one of the candidate blocks and, if yes, with which block it is merged. When a block is merged with another block, the prediction parameters including reference picture indices and motion parameter vectors are inferred to be equal to the corresponding parameters of the block that is merged with the current block. The coding of the merging information with the motion parameters can be combined (and interleaved) in different ways. According to some embodiments of the present invention, the merging information is coded before the motion vector components (and reference picture indices). And if the merging information signals that the current block is merged with another block, the prediction parameters of the current block are not coded but inferred to be equal to the block with which the current block is merged. Otherwise, the prediction information including the motion parameter vectors are coded as described according to the FIGS. 4, 5 and/or FIG. 9 (or according to a particular embodiment). According to further embodiments of the present invention, first one or more of the prediction parameters (i.e., motion parameter vector components and/or reference picture indices) are coded. And based on the transmitted information (for example, based on the reconstruction 118 of the first subset 212), the candidate block or blocks for the merging are determined. Based on the set of candidate blocks, the merging information is transmitted. If the merging information signals that the current block is merged with another block, the prediction parameters of the current block are inferred to be equal to the block with which the current block is merged (and the already transmitted components may be ignored). Otherwise, the remaining prediction information including the motion parameter vectors are coded as described according to FIGS. 4, 5 or FIG. 9 (or according to a particular embodiment).

According to further embodiments, block-based examples described above may be generalized for arbitrary image regions. The motion parameter prediction encoding remain the same, only the determination of neighboring regions (for example the step 510) of the method 500 according to FIG. 5) is adapted. According to some embodiments of the present invention, all picture regions that contain a sample (or a pixel) that represents a direct neighbor of any sample (of any pixel) inside the current region and have already been coded or reconstructed (i.e., precede the current region in coding order or reconstruction order) are selected as candidate regions.

Figure 10:
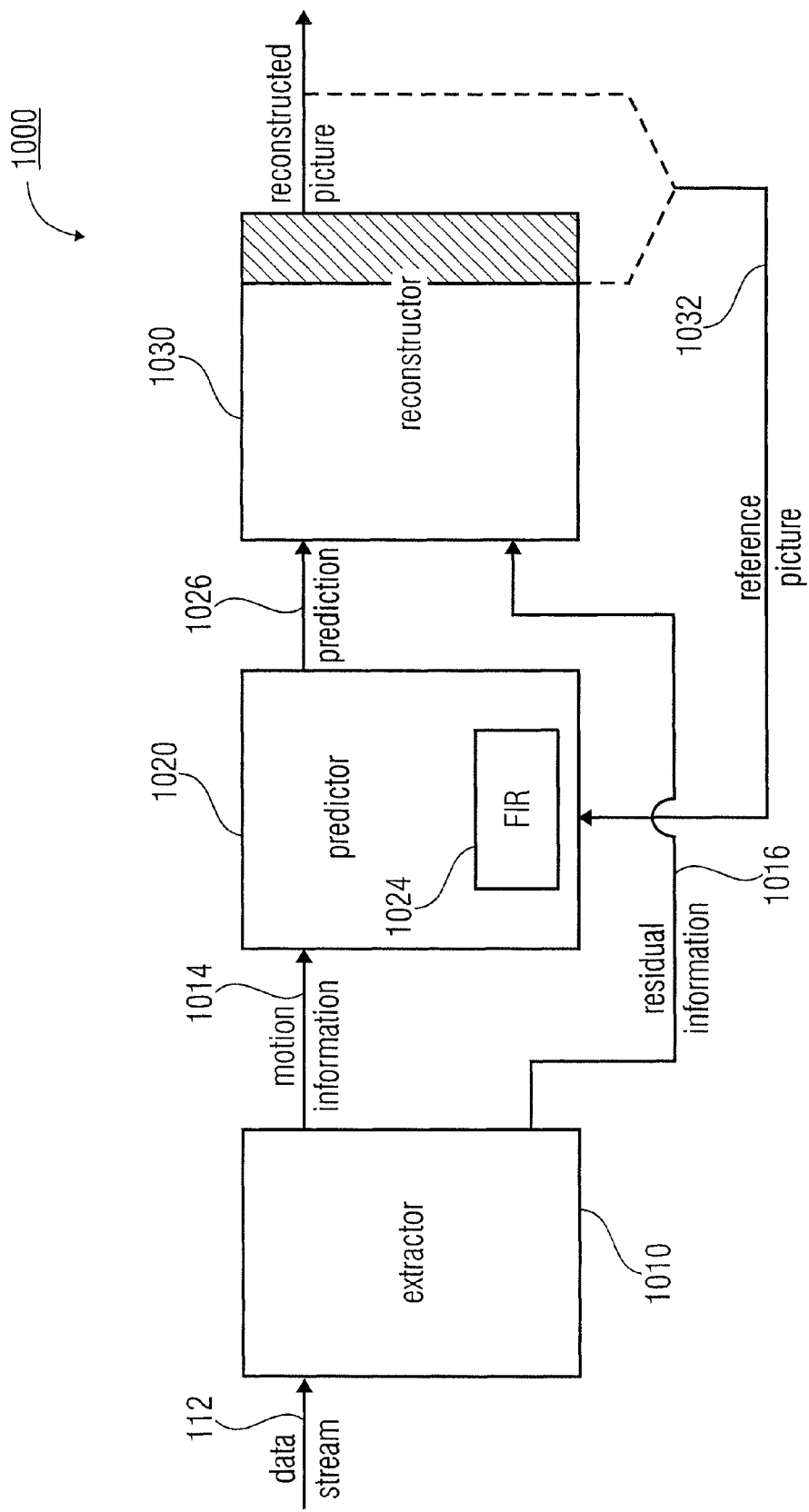
FIG. 10 shows a block diagram of a hybrid video decoder in which a video decoder according to an embodiment of the present invention may be implemented.

FIG. 10 shows a block diagram of a hybrid video decoder 1000 using motion-compensated prediction. A video decoder according to an embodiment of the present invention may be implemented in the hybrid video decoder 1000. The hybrid video decoder 1000 comprises an extractor 1010, a predictor 1020 and a reconstructor 1030. The predictor 1020 comprises an FIR filter 1024. The extractor 1010 is configured to extract motion information 1014 and residual information 1016 for a predetermined region of a picture of a video from a data stream 112. The predictor 1020 is configured to provide, depending on the motion information 1014 for the predetermined region of the picture, a prediction 1026 for the predetermined region of the picture. The predictor 1020 is configured to provide the prediction 1026 by interpolating a reference picture 1032 by using the FIR filter 1024. The reconstructor 1030 is configured to reconstruct the current picture at the predetermined region using the prediction 1026 for the predetermined region and the residual information 1016 for the predetermined region.

The motion information 1014, which are extracted by the extractor 1010 may be transmitted in the data stream 112, or may be predicted in the extractor 1010. A video decoder according to an embodiment of the present invention, may, therefore, be implemented in the extractor 1010 of the hybrid video decoder 1000, to extract the motion information 1014 out of the data stream 1012. The motion information 1014 may, therefore, comprise the reconstruction 118 of the first subset 212 and the reconstruction 126 of the second subset 214, in other words, the motion information 1014 may be the plurality of motion parameters, defining the motion-compensated prediction of the predetermined region of the picture of the video or in other words the motion parameter vector for the predetermined region of the picture.

In order to summarize, embodiments of the present invention create a concept for interleaved motion parameter prediction and motion parameter coding in video coding applications. Motion parameters are usually represented by vectors, which consist of two or more components (of subsets). As a typical example, the motion of a picture region can be described by a displacement vector consisting of a horizontal and a vertical component. In standard technology coding (for example in the H.264 standard), the motion parameter components of the motion parameter vector are first independently predicted and then the differences between the actual motion parameter components and their predictions are transmitted.

Embodiments of the present invention describe a concept by which the dependencies between the motion parameter components (of a motion parameter vector determining the motion-compensated prediction of a predetermined region of a picture) can be employed for decreasing the bit rate needed for the transmitting of the motion parameter vectors. This is achieved by interleaving the prediction and coding of the motion parameter components for a motion parameter vector. The already coded motion vector components (or more accurately, the transmitted differences between the actual value and the prediction of the corresponding motion parameter components) can be used for improving the prediction of the remaining motion vector components of the same motion parameter vector. Embodiments of the present invention are applicable to all video coding application in which motion parameters are transmitted for regions of a picture. An advantage of the embodiments of the present invention is a decreased bit rate for transmitting the motion parameters and hence an improved coding efficiency relative to state of the art techniques.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A video decoder using motion-compensated prediction comprising:
   a predictor configured to predict a first subset of parameters of a plurality of motion parameters defining the motion-compensated prediction of a predetermined region of a picture of a video to acquire a prediction for the first subset; and
   a reconstructor configured to reconstruct the first subset of parameters from the prediction for the first subset and residual information for the first subset comprised in a data stream, to acquire a reconstruction of the first subset, wherein the predictor is configured to predict a second subset of parameters of the plurality of motion parameters, being disjoint from the first subset using the reconstruction of the first subset, to acquire a prediction for the second subset;

the predictor is configured to determine a first candidate set of previously decoded motion information, each motion information defining a plurality of motion parameters defining the motion-compensated prediction for a region neighboring the predetermined region or defining a motion-compensated prediction for the predetermined region in a previously decoded picture, to acquire the prediction for the first subset;

the predictor is configured to select a second candidate set as a subset of the first candidate set of previously decoded motion information based on the reconstruction of the first subset, and to acquire the prediction for the second subset using the second candidate set; and at least one of the predictor and the reconstructor comprises a hard implementation.

2. The video decoder according to claim 1,
wherein the reconstructor is further configured to reconstruct the second subset from the prediction for the second subset and from a residual information for the second subset comprised in the data stream to acquire a reconstruction of the second subset.

3. The video decoder according to claim 1,
wherein the predictor is configured such that the first subset determines a coordinate for a first direction and the second subset lacks a coordinate for the first direction or the first subset determines a reference picture index, with the second subset lacking a reference picture index or the second subset determines a reference picture index, with the first subset lacking a reference picture index.

4. The video decoder according to claim 2, further comprising:
an image sample reconstructor configured to predict the predetermined region of the picture of the video by applying the reconstruction of the first subset and the reconstruction of the second subset to an already reconstructed picture of the video to acquire a prediction of the predetermined region, wherein the image sample reconstructor is further configured such that the way in which the reconstruction of the first subset influences the prediction is different from the way in which the reconstruction of the second subset influences the prediction and such that image samples of the prediction of the predetermined region are dependent on both, the first subset and the second subset.

5. The video decoder according to claim 1,
wherein the predictor is configured such that the selection of the second candidate set is based on a difference measure between the reconstruction of the first subset and first subsets of each of the motion information of the first candidate set.

6. The video decoder according to claim 1,
wherein the reconstructor is configured to acquire the first residual information for the first subset and a second residual information for the second subset from the data stream, using entropy decoding using a probability estimation, and to adapt the probability estimation for entropy decoding the second residual information for the second subset, using the reconstruction of the first subset.

7. A method for reconstructing motion parameters comprising:
predicting a first subset of parameters of a plurality of motion parameters, defining the motion-compensated prediction of a predetermined region of a picture of a video to acquire a prediction for the first subset;
reconstructing the first subset of parameters from the prediction for the first subset and from a residual information for the first subset comprised in a data stream, to acquire a reconstruction of the first subset;
predicting a second subset of parameters of a plurality of motion parameters, being disjoint from the first subset using the reconstruction of the first subset;
determining a first candidate set of previously decoded motion information, each motion information defining a plurality of motion parameters defining the motion-compensated prediction for a region neighboring the predetermined region or defining a motion-compensated prediction for the predetermined region in a previously decoded picture, to acquire the prediction for the first subset; and
selecting a second candidate set as a subset of the first candidate set of previously decoded motion information based on the reconstruction of the first subset, and acquiring the prediction for the second subset using the second candidate set.

8. The video decoder according to claim 1,
wherein the plurality of motion parameters form a motion parameter vector with two or more components, wherein the first subset is a first component of the motion parameter vector or a first list of components of the motion parameter vector and the second subset is a second component or a second list of components of the motion parameter vector.

9. The video decoder according to claim 1,
wherein the predictor is configured to determine a first candidate set of previously decoded motion information, each motion information defining a plurality of motion parameters defining the motion-compensated prediction for a region neighboring the predetermined region or defining a motion-compensated prediction for the predetermined region in a previously decoded picture, to acquire the prediction for the first subset, and
wherein the predictor is configured to select a second candidate set as a subset of the first candidate set of previously decoded motion information based on the reconstruction of the first subset, and to acquire the prediction for the second subset using the second candidate set.

10. The method according to claim 7,
wherein the plurality of motion parameters form a motion parameter vector comprising two or more components, wherein the first subset is a first component of the motion parameter vector or a first list of components of the motion parameter vector and the second subset is a second component or a second list of components of the motion parameter vector.

11. A non-transitory computer readable digital storage medium comprising stored thereon a computer program having a program code for performing, when running on a computer, a
method for reconstructing motion parameters comprising:
predicting a first subset of parameters of a plurality of motion parameters, defining the motion-compensated prediction of a predetermined region of a picture of a video to acquire a prediction for the first subset;
reconstructing the first subset of parameters from the prediction for the first subset and from a residual information for the first subset comprised in a data stream, to acquire a reconstruction of the first subset;

predicting a second subset of parameters of a plurality of motion parameters, being disjoint from the first subset using the reconstruction of the first subset;

determining a first candidate set of previously decoded motion information each motion information defining a plurality of motion parameters defining the motion-compensated prediction for a region neighboring the predetermined region or defining a motion-compensated prediction for the predetermined region in a previously decoded picture, to acquire the prediction for the first subset; and selecting a second candidate set as a subset of the first candidate set of previously decoded motion information based on the reconstruction of the first subset, and acquiring the prediction for the second subset using the second candidate set.

12. A video decoder using motion-compensated prediction comprising:

a predictor configured to predict a first subset of parameters of a plurality of motion parameters defining the motion-compensated prediction of a predetermined region of a picture of a video to acquire a prediction for the first subset; and a reconstructor configured to reconstruct the first subset of parameters from the prediction for the first subset and residual information for the first subset comprised in a data stream, to acquire a reconstruction of the first subset; wherein the predictor is configured to predict a second subset of parameters of the plurality of motion parameters, being disjoint from the first subset using the reconstruction of the first subset, to acquire a prediction for the second subset;

the first subset of parameters represents one of a vertical component or a horizontal component of a motion vector and wherein the second subset of parameters represents the remaining component of the motion vector; and at least one of the predictor or the reconstructor comprises a hardware implementation.

* * * * *